US012739689B2

(12) United States Patent
Leather et al.

(10) Patent No.: US 12,739,689 B2
(45) Date of Patent: Sep. 15, 2026

(54) ASSISTED COMMUNICATION SYSTEMS

(71) Applicant: Fraunhofer-Gesellschaft zur Förderung der angewandten Forschung e.V., Munich (DE)

(72) Inventors: Paul Simon Holt Leather, Berlin-Schlachtensee (DE); Thomas Haustein, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 19/348,875

(22) Filed: Oct. 3, 2025

(65) Prior Publication Data

US 2026/0032500 A1 Jan. 29, 2026

Related U.S. Application Data

(63) Continuation of application No. PCT/EP2024/055215, filed on Feb. 29, 2024.

(30) Foreign Application Priority Data

Apr. 6, 2023 (EP) .................................... 23166996

(51) Int. Cl.

| | |
|---|---|
| ***H04W 24/02*** | (2009.01) |
| ***G06N 20/00*** | (2019.01) |
| ***H04W 24/08*** | (2009.01) |
| ***H04W 24/10*** | (2009.01) |
| ***H04W 48/16*** | (2009.01) |
| ***H04W 48/20*** | (2009.01) |

(52) U.S. Cl.

CPC ........... *H04W 24/10* (2013.01); *H04W 48/16* (2013.01); *H04W 48/20* (2013.01)

(58) Field of Classification Search

CPC ...... H04W 24/10; H04W 48/16; H04W 48/20
See application file for complete search history.

(56) References Cited

U.S. PATENT DOCUMENTS

| | | | |
|---|---|---|---|
| 5,528,503 | A | 6/1996 | Moore |
| 2016/0378080 | A1 | 12/2016 | Uppala |

(Continued)

FOREIGN PATENT DOCUMENTS

| | | | |
|---|---|---|---|
| EP | 3873137 | A1 | 9/2021 |
| FR | 3113532 | A1 | 2/2022 |

(Continued)

OTHER PUBLICATIONS

International Search Report and Written Opinion dated Jul. 22, 2024, issued in application No. PCT/EP2024/055215.
3GPP TS 38.304 V17.0.0; "NR; User Equipment (UE) procedures in idle mode and RRC Inactive state (Release 17);" Mar. 2022; pp. 1-50.

(Continued)

*Primary Examiner* — Joseph E Dean, Jr.
(74) *Attorney, Agent, or Firm* — McClure, Qualey & Rodack, LLP

(57) ABSTRACT

A method for operating a wireless communication scenario comprises operating at least one device in the wireless communication scenario; obtaining operation information relating to an operation of the device in the wireless communication scenario; processing of the operation information to generate a contextual information relating to at least one of an influence of the operation of the device on the wireless communication scenario and an influence of the operation of the wireless communication scenario on the device; and; adapting the operation of the device and/or the wireless communication scenario based on the contextual information.

3 Claims, 25 Drawing Sheets

(56) References Cited

U.S. PATENT DOCUMENTS

| | | | | |
|---|---|---|---|---|
| 2020/0133211 | A1 | 4/2020 | Lee | |
| 2022/0248237 | A1 | 8/2022 | Hu | |
| 2023/0239715 | A1* | 7/2023 | Kainulainen | H04W 24/10 370/252 |

FOREIGN PATENT DOCUMENTS

| | | | |
|---|---|---|---|
| KR | 20190093204 | A | 8/2019 |
| WO | 2022136520 | A1 | 6/2022 |

OTHER PUBLICATIONS

3GPP TS 38.101-1 V17.6.0; "NR; User Equipment (UE) radio transmission and reception; Part 1: Range 1 Standalone, Release 17;" Jun. 2022; pp. 1-720.

3GPP TS 38.101-2 V17.6.0; "NR; User Equipment (UE) radio transmission and reception; Part 2: Range 2 Standalone, Release 17;" Jun. 2022; pp. 1-219.

3GPP TS 38.213 V17.0.0; "NR; Physical layer procedures for control, Release 17;" Dec. 2021; pp. 1-225.

3GPP TS 38.331 V16.7.0; "NR; Radio Resource Control (RRC) Protocol specification, Release 16;" Dec. 2021; pp. 1-963.

Xie, H., et al.; "A Lite Distributed Semantic Communication for Internet of Things;" Submit to IEEE Journal on Selected Areas in Communications; Jul. 2020; pp. 1-11.

Abilov, A., et al.; "Priority Retransmission in AL-ARQ for MPEG Streaming over WLAN;" 2015 International Siberian Conference on Control and Communications (SIBCON); 2015; pp. 1-6.

* cited by examiner $108_1$ $108_2$ $108_3$
$UE_1$ $UE_2$ $UE_3$
$112_2$ $112_1$ $110_1$ $110_2$
ANT
gNBs core
$gNB_1$ $gNB_2$ $gNB_3$ $gNB_4$ $gNB_5$
$116_1$ $114_1$ $116_2$ $114_2$ $116_3$ $114_3$ $116_4$ $114_4$ $116_5$ $114_5$
$106_1$ $106_2$ $106_3$ $106_4$ $106_5$
IoT IoT
$RAN_n$

900

Operating at least one device in the wireless communication scenario — 910

Operating a database comprising contextual information relating to at least one of an influence of the operation of the device on the wireless communication scenario and an influence of the operation of the wireless communication scenario on the device; wherein the influence is a functional relationship between an input parameter of the operation and an output parameter of the operation — 920

Determining a target behavior of the device and/or of the wireless communication scenario — 930

Using the contextual information to generate a command for the device and/or a different apparatus of the wireless communication scenario as a receiving entity to instruct the receiving entity to apply an input parameter to obtain the target behavior — 940

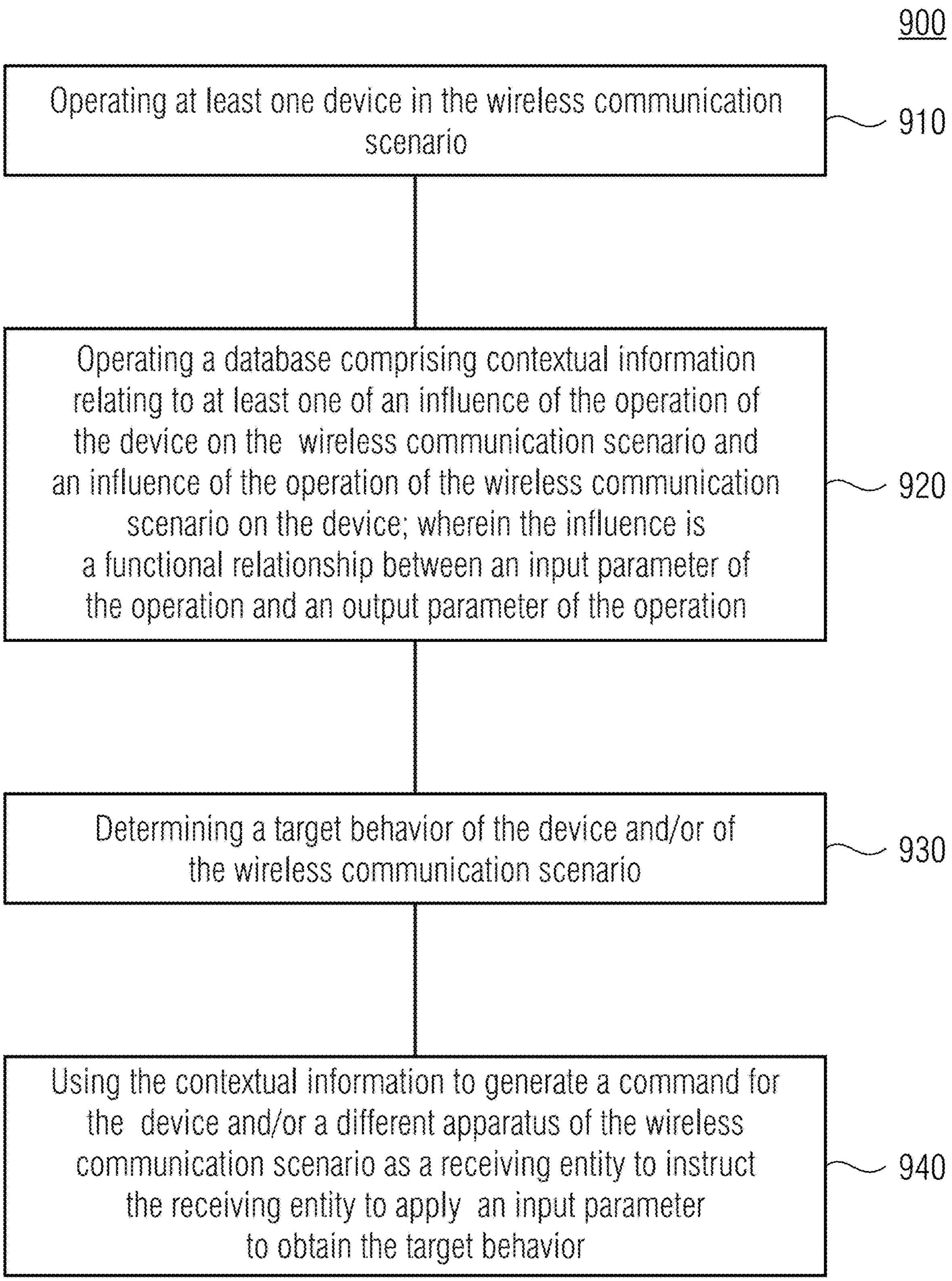

Fig. 9

| ID | | see | modes | | | | duration / speed | complexity energy consumption |
|---|---|---|---|---|---|---|---|---|
| 1 | learning modes | NA | uninformed | | | | possibly very long and very slow | low complexity but high consumption due to length of duration |
| 2 | learning modes | NA | partially informed | | | | possibly not so long and with reasonable speed | medium to high complexity thus requiring more power but since the duration is shorter, consumption similar to 1 |
| | | cloud with contextual information & processing capabilities (all functions inside or disaggregated) | | | | | | |
| | | | AI/ML | DP | DT | DB | | |
| 3 | execution modes (assisted by) | figure 13 | X | | | | very long and slow | very high / high |
| 4 | execution modes (assisted by) | figure 12 | | | X | | medium / medium | high / medium |
| 5 | execution modes (assisted by) | figure 15 | | | | X | short / fast | medium / low |
| 6 | execution modes (assisted by) | figure 14 | X | | X | | very long faster than 3 | very high / very high |
| 7 | execution modes (assisted by) | NA | X | | | X | very long faster than 6 | very high / high |
| 8 | execution modes (assisted by) | NA | | | X | X | short / very fast | high / medium |
| 9 | execution modes (assisted by) | figure 16 | X | X | X | X | very long and slow at first but then very short and quick | very complex with very high energy consumption at first but then simplified with lower energy consumption |

Fig. 19

| | | apparatus / devices / entity (all functions inside or disaggregated) | | | | | | |
|---|---|---|---|---|---|---|---|---|
| ID | | see | AI / ML | DP | DT | DB | | |
| 10 | | figure 17 | X | X | X | | very long and slow at first but then very short and quick | |
| 11 | | figure 18 | X | X | X | X | very long and slow at first but then very short and quick | |
| 12 | | | X | X | | X | | |
| 13 | | | | X | X | X | | |
| 14 | | | X | X | | X | | |
| 15 | | | X | X | X | | | |
| 16 | | | X | X | | | | |
| 17 | | | X | | | X | | |
| 18 | | | X | | X | | | |
| 19 | | | X | | | | | |
| 20 | | | | | X | | | |
| 21 | | | | | | X | | |

Fig. 20

ASSISTED COMMUNICATION SYSTEMS

CROSS-REFERENCE TO RELATED APPLICATIONS

This application is a continuation of copending International Application No. PCT/EP2024/055215, filed Feb. 29, 2024, which is incorporated herein by reference in its entirety, and additionally claims priority from European Application No. 23166996.1, filed Apr. 6, 2023, which is also incorporated herein by reference in its entirety.

Embodiments of the present application relate to the field of wireless communication, and more specifically, to wireless communication between a user equipment and a base station. Some embodiments relate to network guided initial network/cell-search.

BACKGROUND OF THE INVENTION

FIG. 1 is a schematic representation of an example of a terrestrial wireless network 100 including, as is shown in FIG. 1(*a*), a core network 102 and one or more radio access networks RAN1, RAN2, . . . . RANN. FIG. 1(*b*) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the RANn may include more or less such cells, and RANn may also include only one base station. FIG. 1(*b*) shows two users UE1 and UE2, also referred to as user equipment, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. Further, FIG. 1(*b*) shows two IoT devices 1101 and 1102 in cell 1064, which may be stationary or mobile devices. The IoT device 1101 accesses the wireless communication system via the base station gNB4 to receive and transmit data as schematically represented by arrow 1121. The IoT device 1102 accesses the wireless communication system via the user UE3 as is schematically represented by arrow 1122. The respective base station gNB1 to gNB5 may be connected to the core network 102, e.g., via the S1 interface, via respective backhaul links 1141 to 1145, which are schematically represented in FIG. 1(*b*) by the arrows pointing to "core". The core network 102 may be connected to one or more external networks. Further, some or all of the respective base station gNB1 to gNB5 may connected, e.g., via the S1 or X2 interface or the XN interface in NR, with each other via respective backhaul links 1161 to 1165, which are schematically represented in FIG. 1(*b*) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB), the physical downlink shared channel (PDSCH) carrying for example a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels, or more precisely the transport channels according to 3GPP, may further include the physical random access channel (PRACH or RACH) used by UEs for accessing the network once a UE is synchronized and has obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix (CP) length. All OFDM symbols may be used for DL or UL or only a subset, e.g., when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the NR (5G), New Radio, standard.

The wireless network or communication system depicted in FIG. 1 may by a heterogeneous network having distinct overlaid networks, e.g., a network of macro cells with each macro cell including a macro base station, like base station gNB1 to gNB5, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the NR (5G), new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2*a* is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 2*b* is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 2*b* which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage arca 200 shown in FIG. 2*a*, in addition to the NR mode 1 or LTE mode 3 UEs 202, 204 also NR mode 2 or LTE mode 4 UEs 206, 208, 210 are present.

Naturally, it is also possible that the first vehicle 202 is covered by the gNB, i.e. connected with Uu to the gNB, wherein the second vehicle 204 is not covered by the gNB and only connected via the PC5 interface to the first vehicle 202, or that the second vehicle is connected via the PC5 interface to the first vehicle 202 but via Uu to another gNB, as will become clear from the discussion of FIGS. 4 and 5.

FIG. 3 is a schematic representation of a scenario in which two UEs directly communicating with each, wherein only one of the two UEs is connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204, wherein only the first vehicle 202 is in the coverage area 200 of the base station gNB. Both vehicles 202, 204 are connected directly with each other over the PC5 interface.

FIG. 4 is a schematic representation of a scenario in which two UEs directly communicating with each, wherein the two UEs are connected to different base stations. The first base station gNB1 has a coverage area that is schematically represented by the first circle 2001, wherein the second station gNB2 has a coverage area that is schematically represented by the second circle 2002. The UEs directly communicating with each other include a first vehicle 202 and a second vehicle 204, wherein the first vehicle 202 is in the coverage area 2001 of the first base station gNB1 and connected to the first base station gNB1 via the Uu interface, wherein the second vehicle 204 is in the coverage area 2002 of the second base station gNB2 and connected to the second base station gNB2 via the Uu interface.

In wireless communication systems, there may be situations where a device, e.g., an instructing device, transmits controls, commands or instructions to another device, e.g., an instructed device. Such a transmission may be based on the aim or the requirement to cause a specific reaction or behavior at the instructing device. Examples for such instructions may be considered as instructing a UE to use specific resources provided by a base station, to follow a specific schedule or to use a specific beam for communication. Alternatively or in addition, a base station may be an instructed device, for example, when defining by a higher level entity which resources are to be provided by the base station, e.g., in view of a recourse re-use with regard to adjacent cells or the like.

To enhance the transmission or instructions, commands or controls, a wireless communication system may implement a feedback system, e.g., for an open-loop control system and/or a closed-loop control system.

Therefore, there is the need of enhancing command chains in wireless communication systems.

It is noted that the information in the above section is only for enhancing the understanding of the background of the invention and therefore it may contain information that does not form conventional technology and is already known to a person of ordinary skill in the art.

SUMMARY

According to an embodiment, a method for operating a wireless communication scenario ma have the steps of: operating at least one device in the wireless communication scenario; obtaining operation information relating to an operation of the device in the wireless communication scenario; processing of the operation information to generate a contextual information relating to at least one of an influence of the operation of the device on the wireless communication scenario and an influence of the operation of the wireless communication scenario on the device; adapting the operation of the device and/or the wireless communication scenario based on the contextual information.

According to another embodiment, a method for operating a wireless communication scenario may have the steps of: operating at least one device in the wireless communication scenario; operating a database comprising contextual information relating to at least one of an influence of the operation of the device on the wireless communication scenario and an influence of the operation of the wireless communication scenario on the device; wherein the influence is a functional relationship between an input parameter of the operation and an output parameter of the operation; determining a target behaviour of the device and/or of the wireless communication scenario; and using, the contextual information to generate a command for the device and/or a different apparatus of the wireless communication scenario as a receiving entity to instruct the receiving entity to apply an input parameter to obtain the target behaviour.

According to another embodiment, an apparatus configured for operating in a wireless communication scenario may have: an interface configured for receiving and processing a command related to an operation of the apparatus in the wireless communication scenario; and for receiving and processing contextual information, the contextual information relating to at least one of an influence of the operation of a device on the wireless communication scenario and an influence of the operation of the wireless communication scenario on the device; a control unit configured for processing the command and the contextual information to derive a request for adapting the operation of the apparatus; wherein the apparatus is configured for operating according to the request.

According to another embodiment, an apparatus configured for operating in a wireless communication scenario may have: an interface configured for receiving and processing contextual information, the contextual information relating to at least one of an influence of the operation of a device on the wireless communication scenario and an influence of the operation of the wireless communication scenario on the device; wherein the apparatus is configured for obtaining information about a target system behaviour of at least a part of the wireless communication scenario; and wherein the apparatus comprises a control unit configured for processing the contextual information and the information about the target system behaviour to derive a command for the device or the apparatus; wherein the apparatus comprises an interface for transmitting a signal comprising the command.

BRIEF DESCRIPTION OF THE DRAWINGS

Embodiments of the present invention will be detailed subsequently referring to the appended drawings, in which:

FIG. 9 shows a schematic flow chart of a method for operating a wireless communication scenario using contextual information and in accordance with an embodiment;

FIG. 19 an example table that sets out a summary of the various modes of learning and execution modes according to an embodiment;

FIG. 20 an example table that sets out a summary of various modes of execution according to an embodiment;

DETAILED DESCRIPTION OF THE INVENTION

Figure 1A:
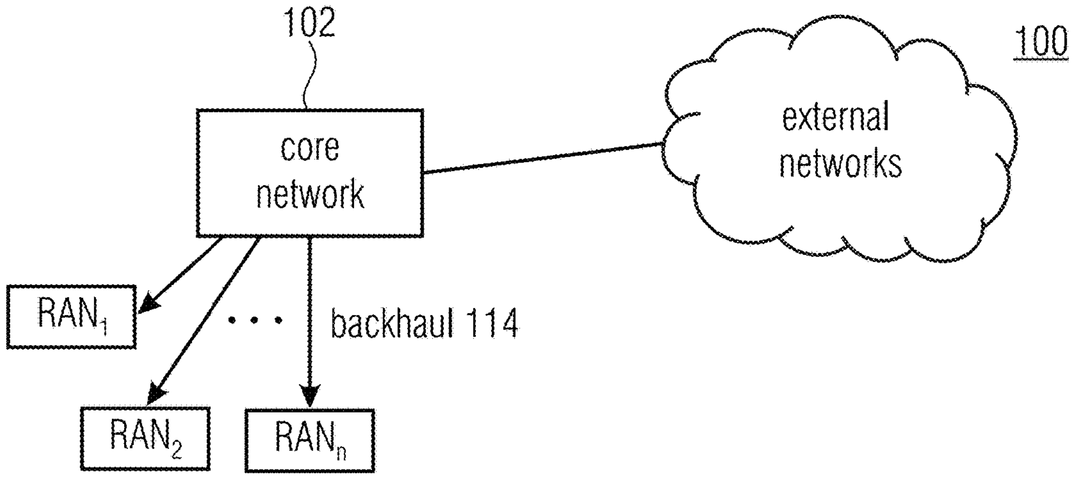
FIG. 1*a* is a schematic representation of an example of a terrestrial wireless network 100 including.
Figure 1B:
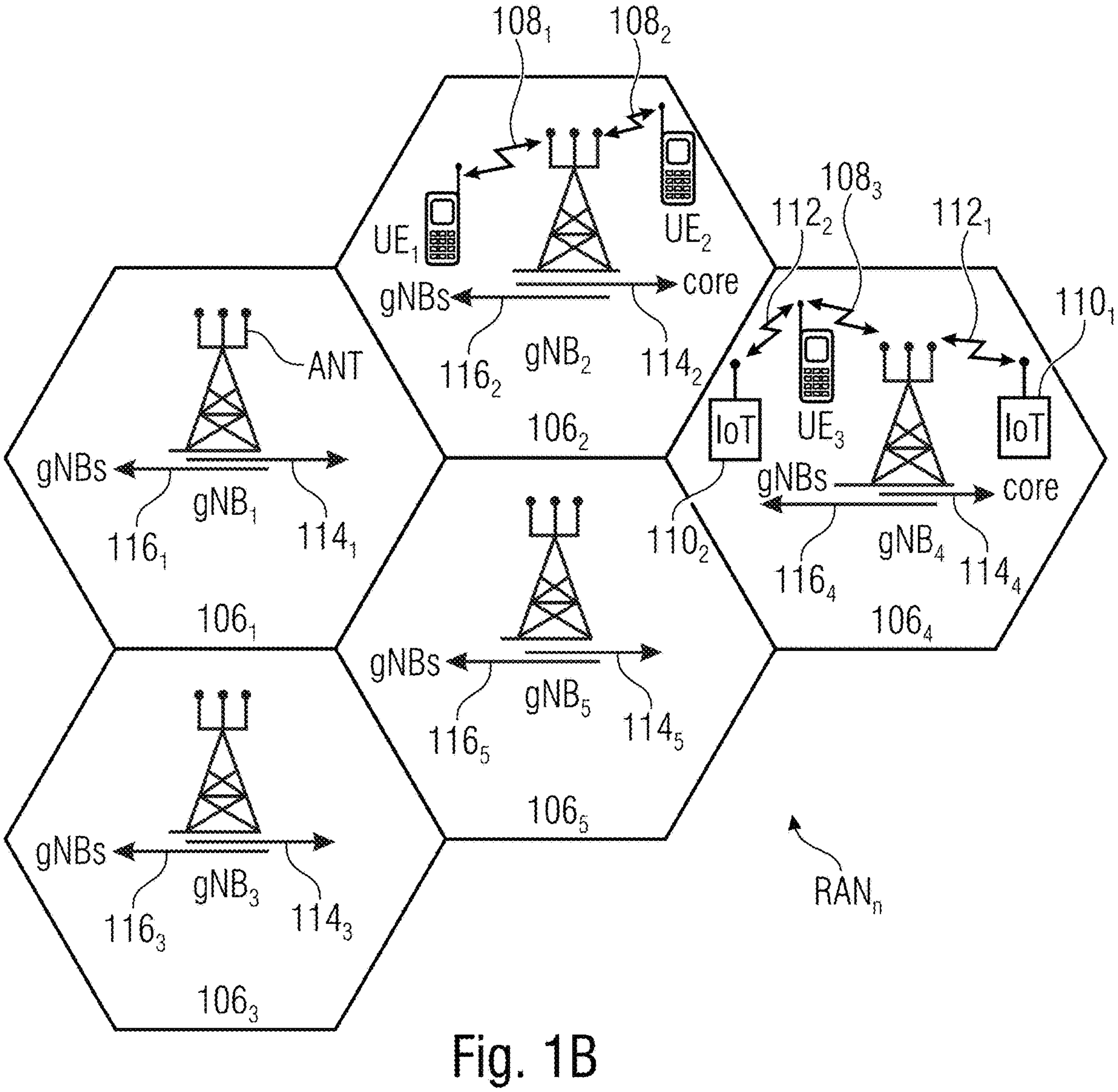
FIG. 1*b* is a schematic representation of an example of a radio access network RANn that may include one or more base stations.
Figure 2A:
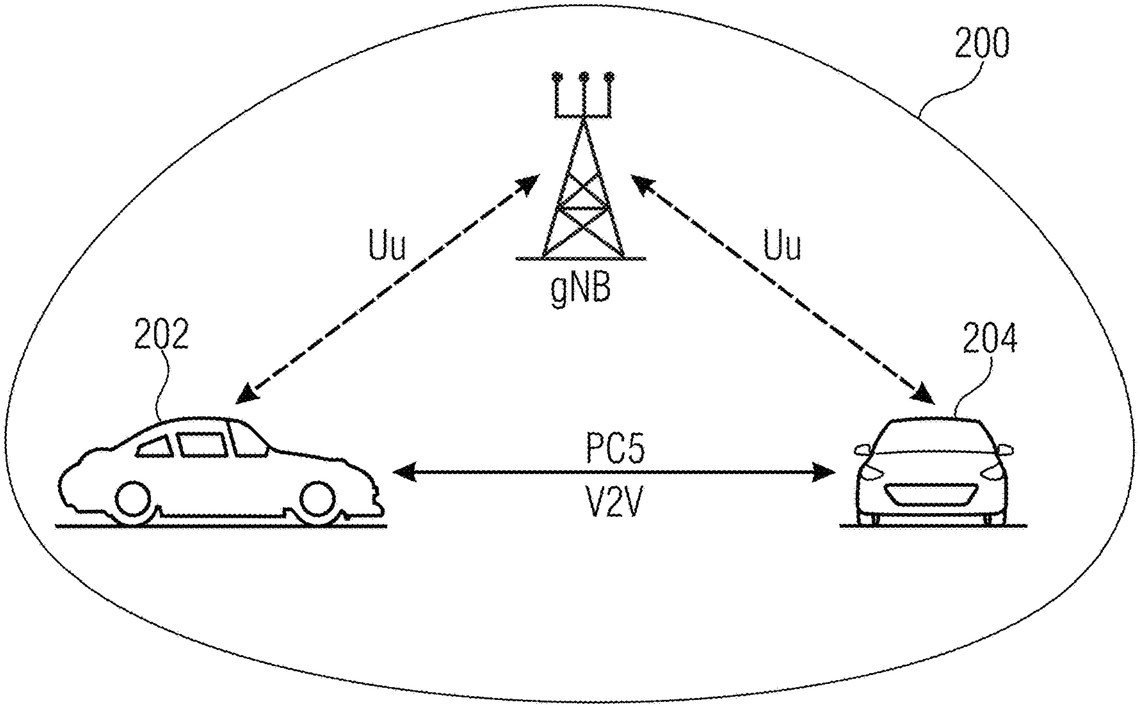
FIG. 2*a* is a schematic representation of an in-coverage scenario in which UEs directly communicating with each other are connected to a base station.
Figure 2B:
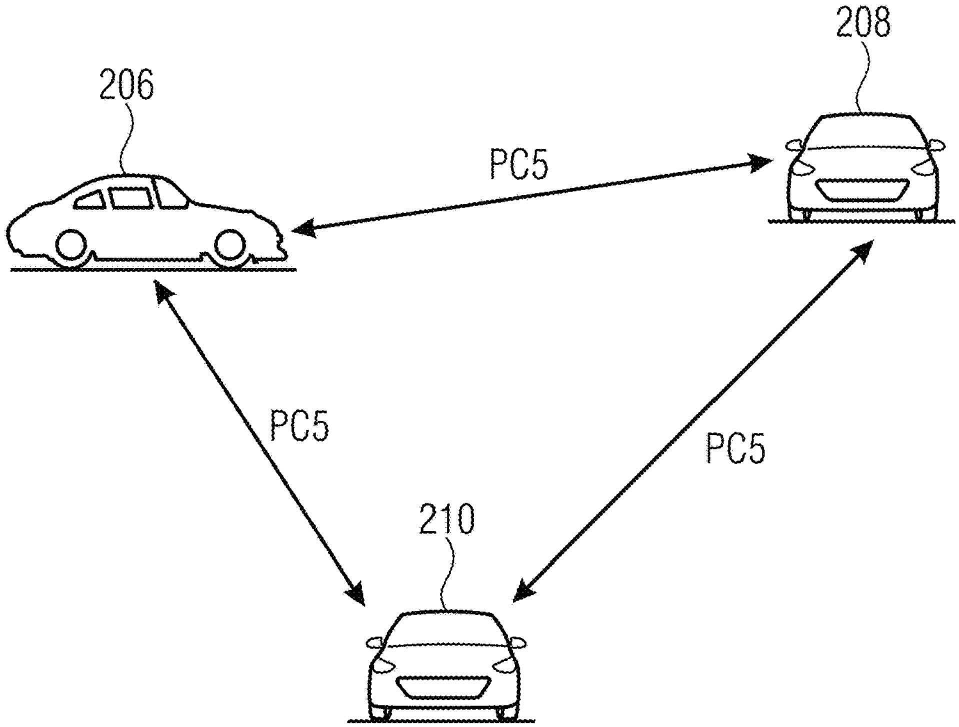
FIG. 2*b* is a schematic representation of an out-of-coverage scenario in which UEs directly communicating with each other receive no SL resource allocation configuration or assistance from a base station.
Figure 3:
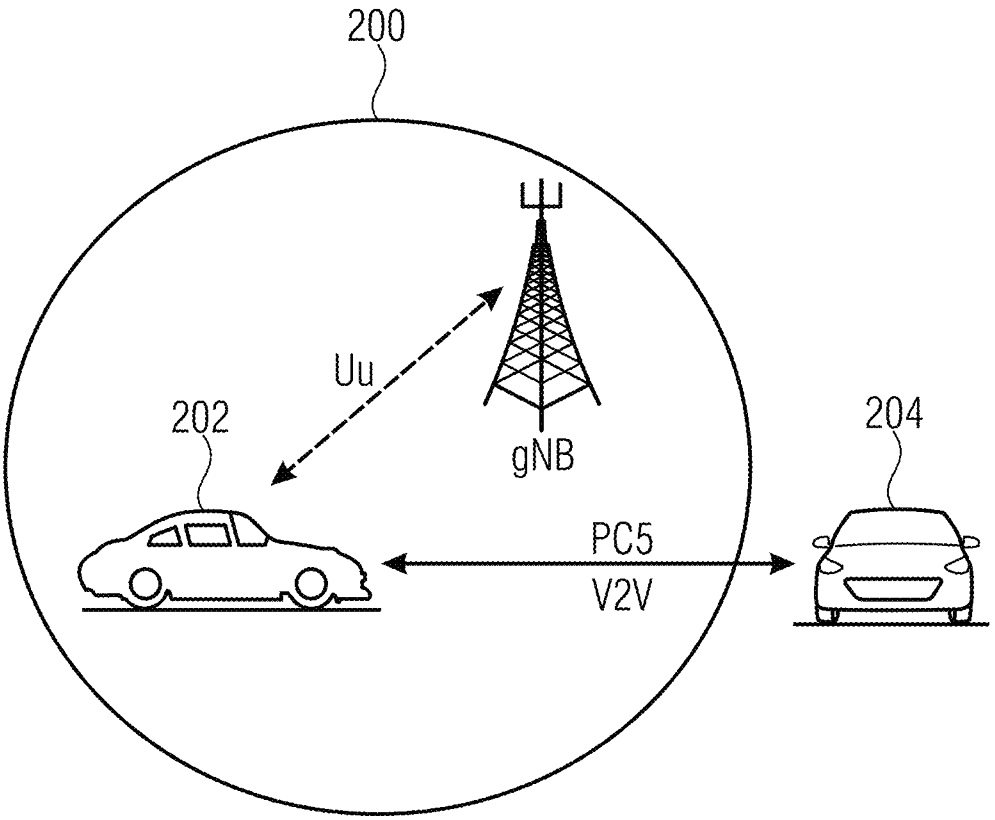
FIG. 3 is a schematic representation of a partial out-of-coverage scenario in which some of the UEs directly communicating with each other receive no SL resource allocation configuration or assistance from a base station.
Figure 4:
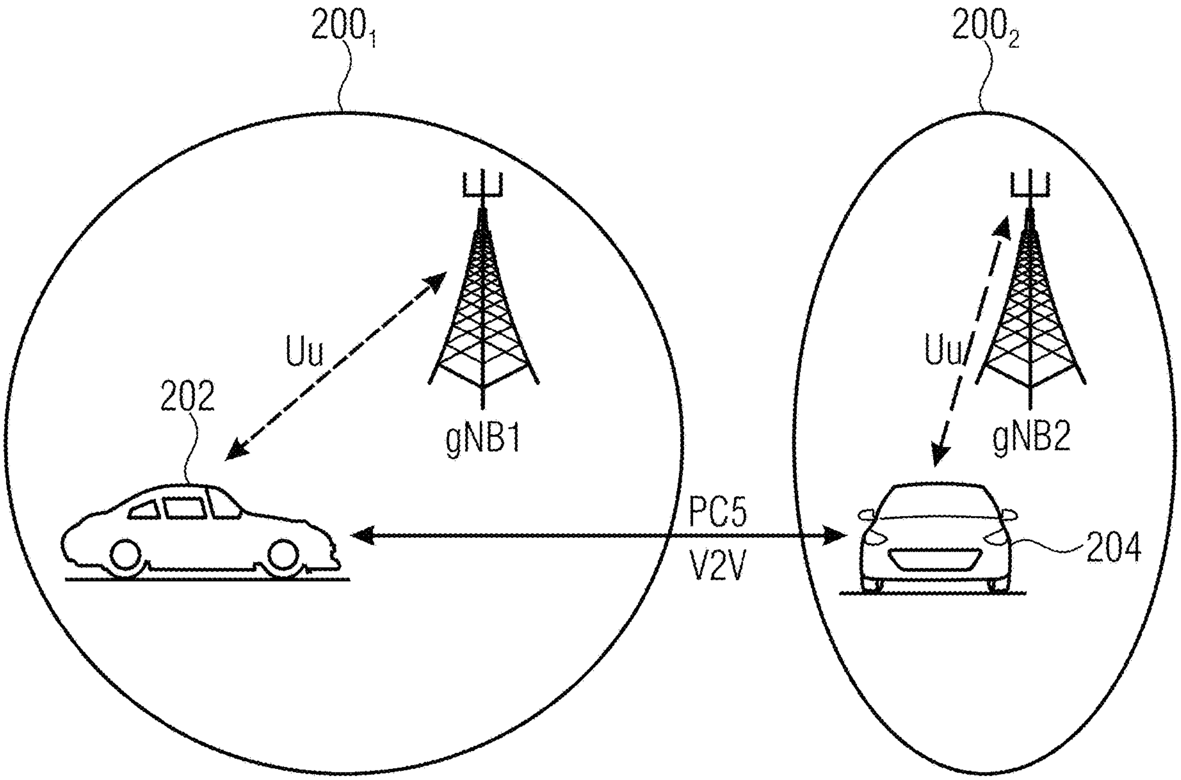
FIG. 4 is a schematic representation of an in-coverage scenario in which UEs directly communicating with each other are connected to different base stations.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

The problem addressed by the embodiments described herein, relates to the manner in which an instructing device (or controller) commands (or controls) an instructed device and, in particular, how the instructions, commands or settings are constructed using contextual information and additional knowledge.

Embodiments relate to a control communication framework enabling at least two devices, an instructing device (A) and an instructed device (B) to exchange system control information allowing the instructed device to change its system behaviour (e.g. transmit strategy) to benefit the instructing device or another device from the change in system behaviour.

In this context, some embodiments relate to a command chain, i.e., to instruct an instructed device with an instructing device. Some details are described hereinafter with respect to such a command chain that may benefit from the embodiments described herein.

A Command System—Command Chain

In state-of-the-art, SOTA control loops, a system or process controller is used to control the output of a system or process. Such a controller may use instructions (or a set of instructions) to instantiate the required settings of the system or process. When realized with digital messages, such settings or sequences of settings are often referred to as a device driver—here the device represent an apparatus, a system or a process.

A classic example is a personal computer with a printer connected to it, e.g., interfacing with an external device in response to the commands of a user. The hardware and software configuration includes a printer device driver. The device driver may be a software program installed on the host computer so that when used together with the computer's operating system and a further application program—for example a word processor—the correct messages or commands are sent from the PC to the printer such that the printer produces a printed output—for example a document—according to the wishes of the user via the application program in use. In this particular example, the system controller (the computer) needs a software device driver that is not only specific to the printer connected to the computer 310 but also to the operating system installed on the computer. Generally speaking, any given hardware device will require a device driver to be installed on the computer that is specific to both the hardware device and the operating system.

With reference to the classical example given earlier, in a standardized SOTA system, a library of device drivers might be provided as part of the operating system such that when a new hardware device is connected to the computer and identifies itself to the computer, the computer then retrieves the appropriate device driver from its library and, if needed, installs it.

However, even when the interface between a controller and a controlled system are standardized at the instruction set level, an a priori knowledge of the instruction sets and sequences thereof has to be known. When considering together with the increasing complexity of devices, systems, processes and combinations thereof—for example, their interaction, interdependency, concatenation, coordination, scheduling, orchestration, cooperation and calibration—the utilization of certain features, might not be possible by a standard controller.

Non-proprietary standard-compliant products are to satisfy the requirement of system interoperability. This means that the controllers and devices made by various manufacturers can be used interchangeably as the components of a fully functional system. Therefore, and in combination with the innovative and "future proof" use of controllable systems, devices and processes will require new forms of interfaces between the controller or command and the system, entity or process be controlled.

Embodiments enhance the generation and/or use of contextual information in a command chain, such a command chain relating a device, e.g., an instructing device, configured for transmitting a command signal to an instructed device forming a command chain with the instructing device. Such a device comprises an interface configured for transmitting the command signal and a control unit configured for providing an instruction signal comprising an instruction associated to a target behavior of the instructed device. The device is configured for accessing and/or using contextual information indicating a context of the command chain and for generating a command from the instruction based on the contextual information. The command is associated with an operation of the instructed device.

Alternatively or in addition, the device is adapted to provide contextual information indicating a context of the command chain for interpretation of a command belonging to the command chain. The device is configured for transmitting the command signal comprising the command using the interface. That is, as a part of the command chain, the device may provide for a command based on the instructions, the command derived from the instructions by use of the contextual information. The device, however, may also be outside the command chain or not a part thereof, which may allow to provide contextual information to another device being part of a command chain. Using the contextual information may allow to have a low amount of information to be transmitted with the command signal, e.g., based on an assumption which information and/or interpretation and/or contextual information is present at the instructing device. Alternatively or in addition, the device is possibly not required to know the specific details of the command interpretation at the instructed device, but can focus on the targeted behaviour, i.e., a goal that is to be achieved, which provides for a high interoperability of devices of, e.g., different manufacturers.

A device, e.g., an instructed device of such a command chain may be configured for operating based on a received command. The device comprises an interface configured for receiving a command signal comprising the command. The device is configured for accessing/using contextual information indicating a context of the command chain and for generating a setting of the device from the command based on the contextual information. The setting is associated with an operation of the device. The device is configured for implementing and/or executing the settings. The contextual information may be provided by the instructed device or a different entity. This allows to implement commands and/or instructions even if those commands do not fit or are not in accordance with the requested settings or structure of the device. Based on the contextual information, the device may interpret what the target behind the received commands is, so as to operate accordingly.

Some of the embodiments described herein relate to a generation or use of contextual information. Such contextual information may be used at an instructing device so as to derive, from instructions describing a targeted behaviour of an instructed device, respective commands. Such commands may set the targeted behaviour into a context of other parts of the system, for example, the instructing device, the instructed device or an environment of such a command chain.

Further, contextual information may be used at the instructed device so as to set their received commands into a context to interpret the meaning of the received command.

For example, the contextual information may be provided by an entity outside the command chain, e.g., a contextual cloud or an entity thereof as described herein to at least one of the instructing device and the instructed device such that those devices may rely on contextual information being provided from outside the command chain.

Contextual Information

Contextual information may relate to any information or context of the command chain, e.g., the instructing device and/or the instructed device.

In view of the instructing device, the contextual information may indicate or comprise information indicating at least one of a capability of the instructing device, a manufacturer of the instructing device, a type or a model of the instructing device, an operator of the instructing device, a location of the instructing device, an operation condition of the instructing device, an absolute or relative time, a geolocation, a relative location or co-location, an orientation, a set of conditions and/or a validity information.

In view of the instructed device, the contextual information may comprise or indicate at least one of a capability of the instructed device, a manufacturer of the instructed device, a type or model of the instructed device, an operator of the instructed device, a location of the instructed device, an operation condition of the instructed device, an absolute or relative time, a geolocation, a relative location or co-location, an orientation, a set of conditions and a validity of information.

According to one illustrated example, the targeted behaviour that is to be instructed by the instructing device may comprise an indication of the device or a part thereof or a beam thereof to be placed "more to the left". The commands derived thereof may consider information about the instructed device, into which direction the device actually is orientated so as to define the orientation of "left", e.g., with respect to the instructing device or with respect to the instructed device. That is, whether the instructed device will consider its own orientation or the orientation of the instructing device as reference might also form a part of the contextual information. Alternatively or in addition, with regard to the term "more" in "more left" the contextual information may indicate a step size implemented at the instructing device as the step size of movement may be specific, for example, for the type, the model, or the manufacturer or other operating conditions of the instructed device. Knowing or assuming such contextual information may allow to avoid to present a definition within the corresponding command signal and/or may allow to present the command signal even in absence of knowledge about the precise instruction set at the instructed device.

When referring to the target behaviour with regard to the contextual information, according to an example, an instructed device may utilize its own (internal) reference coordinate system, wherefrom the device can reference its relative orientation or position/location with respect to a reference frame/point/anchor/coordinate system.

Alternatively or additionally, an instructed device may be located in a known/given space, e.g. a room, wherein the room provides a referenceable (external) coordinate system e.g. by a feature of the room (such as a specific corner), wherefrom the device can extract/determine its orientation and/or position/location within the said room.

Provided that knowledge about such reference coordinate systems (internal and/or external) are available at the instructing device, e.g., as contextual information, the instructing device can utilize such location/position and orientation reference system(s) to relate specific commands to them. For example a command generated by the instructing device may comprise a set of angles relating to a rotation in planes relative to a coordinate system used by the instructed device (internal and/or external).

As yet a further example, the external coordinate system can be represented globally by e.g. converting into an even larger coordinate reference system e.g. geographic coordinate system, GCS, or planetary coordinate system, PCS, where the command can be related to.

Furthermore, context or knowledge about the shared reference system or the capability to convert from one coordinate system to another and/or the coordinate system the command is referring/related to, has to be exchanged as part of the contextual information between the instructed and/or the instructing device.

In view of the problems related to known systems, the inventors have identified the need for complex tasking to be made with a controller (or commander). This may use a standardized interface that requires little or no previous knowledge of the capabilities of the entity to be controlled, therefore potentially avoiding the need for a device driver. Furthermore, when used in combination with components that use some form of artificial intelligence, partial autonomy is possible.

In this context, replacing system-specific and device-specific instructions used at the controller is considered to provide advantages. The specific instructions and instruction sets may be replaced with command sets that use contextual information provided by the controller and/or the system to be controlled. With this approach, the number of standardized interfaces and their supported command sets is minimized and the stability of the control loop may be supported or guaranteed by the introduction of a command-feedback mechanisms. The latter allows the device, system or process to provide contextual information (including feedback) to the controller. Such feedback may include further requests and/or provisioning of context relevant for the operation of the control loop.

The problems to be solved with the use of contextual information that benefits from the embodiments described herein, may relate to the form of objectives to be achieved, are:

- reduced signalling overhead—shorter commands and shorter command sets require less signal bandwidth and shorter payload lengths;
- reduced latency—shorter commands can be processed quicker and acted upon faster than longer command strings;
- open standards—supported by the availability of contextual information (from both the system controller and the system or process to be controlled) a command parser should be able to interpret the commands it receives from a commander. This means that the commander does not need to know the specific details of the command parser's command set since the commander is also supported with the available contextual information;
- forward compatibility—through the exchange of contextual information and the availability of a minimum or reduced command set, devices introduced into a wireless communication at some time in the future can be integrated with existing equipment through the use of contextual commands.

A communication system according to embodiments may derive suitable commands that enabled an instructing device to control the system behaviour of an instructed device together with the use of contextual information and where the latter relates to the instructing device (A) and/or the instructed device (B). Contextual information obtained, received, used or accessed by a device may be information that provides at least a basis for the device to obtain knowledge about an effect caused by the instructions when considering the side of the instructing device and/or what effect is to be achieved with the instructions when considering the instructed device. This may allow to accept and/or compensate ambiguities thereby possibly allowing a reduced amount of transmitted information as the instructed device understands the received instructions and/or the instructing device may more efficiently transmit instructions or commands being aware what will happen at the instructed device thereby possibly avoiding iterations of negative feedbacks that cause reinstructions.

Embodiments address a generation of such contextual information to be used and/or provided for a more efficient method of conveying system control commands instead of (the traditional method of sending) specific combinations of instructions and settings to control system behaviour. In short, such an approach enables system control through the use of commands that without a contextual reference could be thought to be somewhat abstract especially when compared to low-level settings. Furthermore, provided that sufficient context is provided at either end of the command chain, any uncertainty or ambiguity in the (command) chain can not only be detected but also can be reduced to a level which provides for a requested (command chain) reliability level or for the complete avoidance of malfunction. Such a system using contextual information may consider how to make the contextual information available or shared by using a contextual cloud or database to which such information could be written to and/or read from manner.

The present invention in particular relates to aspects of such a contextual cloud or database, for example to be enabled to provide further capabilities within the framework of the command chain or even to become part of it as opposed to simply providing the storage of contextual information in the form of a database.

Embodiments are aware that an efficiency and effectiveness of the command chain may benefit from sufficient capabilities at least at one end of the command chain between A and B and a quite detailed understanding of what the system capability or behaviour involves. Embodiments are, however, not limited to a circle of influence of the instructing device A to a direct control of the instructed device B but may also allow for an indirect instruction of devices and/or for instructing a plurality, a group or even all (instructed) devices together.

If the system becomes more complex, e.g. many devices interact and their actions are entangled, then it may be beneficial to forward the role of system optimizer or orchestrator to another device or entity to initiate appropriate actions on behalf of instructing device A which than becomes more of a "requesting device" (at least in the sense of wanting or requesting a change of system behaviour). This may be beneficial in a way to consider possibly limited computational power at device A and/or to avoid conflicts between different instructing devices that could control the instructed device differently. According to embodiments, such roles can be forwarded or allocated to a contextual cloud that is equipped with computational means, for example artificial intelligence, machine learning, digital twin processing, storage and retrieval of data (a database). In this way, complex systems may be handled or controlled even when some of the involved entities or devices have limited capabilities. These limited capabilities might include some basic concepts that express a type or form of targeted system behaviour within a defined metric and/or a report or observation of a system behaviour or response according to a well-defined metric. In other words, inputs to the contextual cloud have to be provided within a well-specified set of parameters perhaps using commands which are according to a standard specification.

Embodiments described herein allow for enhancing a control of devices in a wireless communication scenario.

Figure 5:
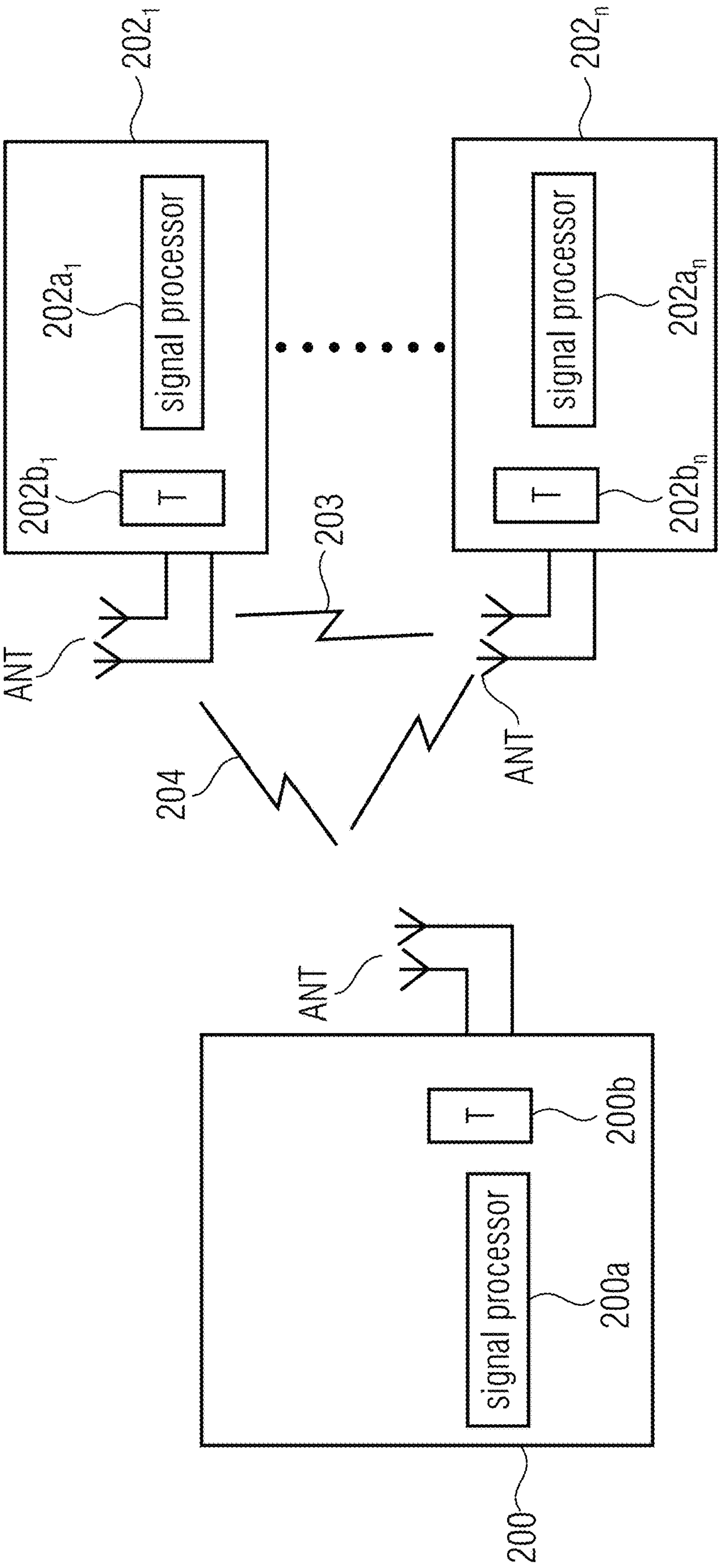
FIG. 5 is a schematic representation of a wireless communication system comprising a transceiver, like a base station or a relay, and a plurality of communication devices, like UEs, according to an embodiment.

Embodiments of the present invention may be implemented in a wireless communication system or network as depicted in FIGS. 1 to 5 including a transceiver, like a base station, gNB, or relay, and a plurality of communication devices, like user equipment's, UEs. FIG. 5 is a schematic representation of a wireless communication system comprising a transceiver 200, like a base station or a relay, and a plurality of communication devices 2021 to 202*n*, like UEs. The UEs might communicated directly with each other via a wireless communication link or channel 203, like a radio link (e.g., using the PC5 interface (sidelink)). Further, the transceiver and the UEs 202 might communicate via a wireless communication link or channel 204, like a radio link (e.g., using the uU interface). The transceiver 200 might include one or more antennas ANT or an antenna array having a plurality of antenna elements, a signal processor 200*a* and a transceiver unit 200*b*. The UEs 202 might include one or more antennas ANT or an antenna array having a plurality of antennas, a processor 202*a*1 to 202*an*, and a transceiver (e.g., receiver and/or transmitter) unit 202*b*1 to 202*bn*. The base station 200 and/or the one or more UEs 202 may operate in accordance with the inventive teachings described herein.

Figure 6:
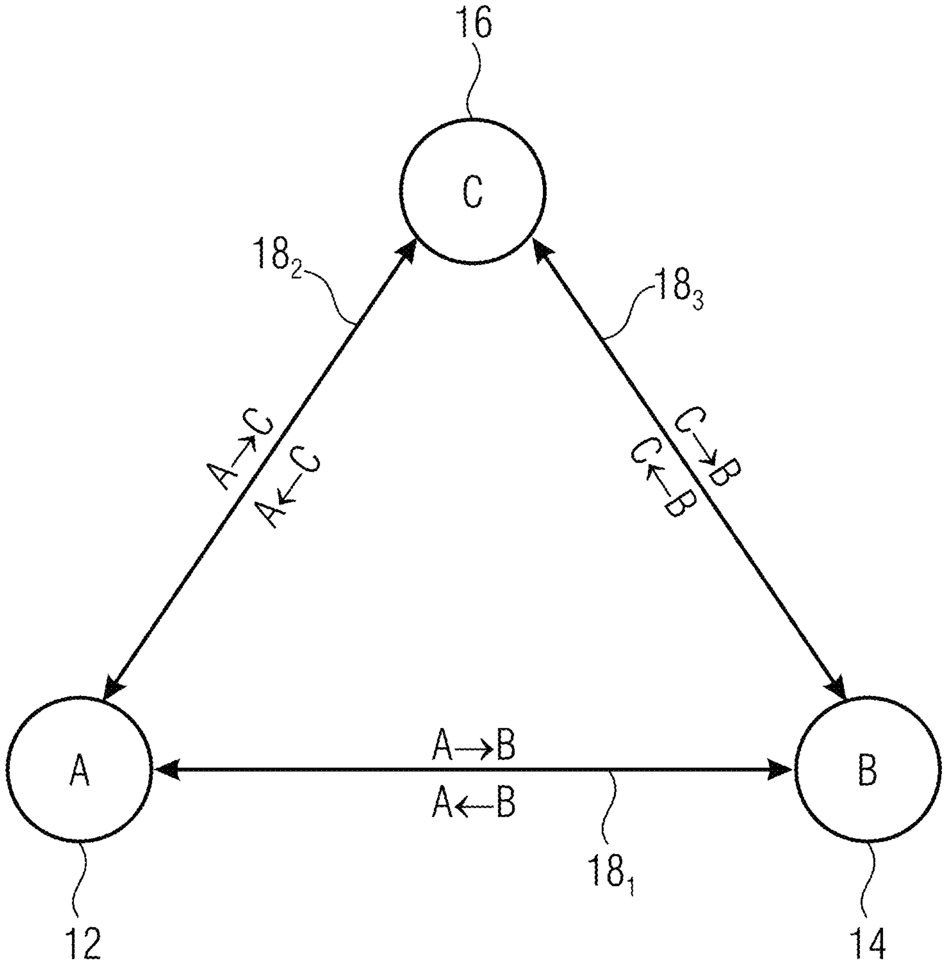
FIG. 6 shows a schematic representation of a wireless communication scenario according to an embodiment.

FIG. 6 shows a schematic representation of a wireless communication scenario according to an embodiment. Therein, three nodes or entities are illustrated, for example, an instructing device 12 being labelled with A, an instructed device 14 being labelled with B and a source or storage 16 to store and/or provide for contractual information. Data transfers $\mathbf{18}_1$, $\mathbf{18}_2$ and $\mathbf{18}_3$ between the nodes may be uni-directional or bidirectional. The node 16 may be referred to as a contextual cloud, wherein it is not necessary to implement node C as a cloud entity. In other words, FIG. 6 shows a triangular arrangement of nodes showing the direction of data transfer between same in which node A represents the instructing device, node B the instructed device and node C the contextual cloud.

The nodes 12, 14 and 16 in FIG. 6 and their inter-nodal relationship are described in the following table together with additional description relating to contextual commands.

| Entity/ Relationship | Background | Highlighted aspects in embodiments |
| --- | --- | --- |
| A: | Instructing Device: Using Contextual information obtained from C in combination with instructions to form commands to be sent to instructed device (B) | Instructing Device may alternatively or in addition Requesting Device, e.g. a victim or a needy device requesting a change of system behaviour of another device (asks C how the system can be changed to cause less “suffering” e.g. interference) or Altruistic Device, e.g. a less-needy or more capable device willing to adapt itself for the benefit of other devices and/or system performance and/or overall network performance (asks C how it can become better). Reporting Device, e.g. a device equipped to measure, observe or monitor the changes in system behaviour resulting from the action of one or more B’s. |
| B: | Instructed Device: Using contextual information obtained from C in combination with commands to form settings to be sent to the system to be controlled. | Instructed Device may alternatively or in addition Responding Device, e.g. an aggressor or a hedonistic device responsive to a request to change its (system) behaviour and a device equipped to report on the action taken in response to the command. or Altruistic Device, e.g. a less-needy or more capable device willing to adapt itself for the benefit of other devices and/or system performance and/or overall network performance (asks C how it can become better). |
| C: | Contextual Cloud: at least partially shared storage of contextual information about instructing device (A) and instructed device (B). Sending see C→A and C→B. Receiving see A→C and B→C. | Contextual Cloud: Processing includes the processing of: instructions; commands; settings; contextual data; contextual information; ambiguity estimation; a digital twin of instructed device (B); a digital twin of instructing device (A). Sending see C→A and C→B. Receiving see A→C and B→C. Learning includes the processing of inputs and outputs resulting in a meaningful concept of the system behaviour Knowledge based on learning assists system optimization. |
| A→B | Sending commands and/or configurations from instructing device (A) to instructed device | Alternatively or in addition or not required due to A→C→B command chain proxy (extension of circle of influence by involvement of C) |
| B→A | Providing Ambiguity Feedback e.g. accepted, rejected, assessment or request for new command | Alternatively or in addition not required due to B→C→A feedback chain proxy (extension of circle of insights/information gathering by involvement of C) |

-continued

| Entity/ Relationship | Background | Highlighted aspects in embodiments |
|---|---|---|
| C→A: | Provision of contextual information from contextual cloud (C) to instructing device (A) about instructed device (B). | Alternatively or in addition, sending commands and/or configurations to device (A) based on system response/ feedback originating from device (B) and with processing performed in contextual cloud. Processing can include: instructions; contextual information (a digital twin of device (A) and/or device (B)); ambiguity estimation; |
| A→C | Provision of contextual information from instructing device (A) to contextual cloud (C) for; instructed device (B) based on request; and/or storage for possible later use. | Alternatively or in addition, provision of data from instructing device (A) and/or Digital Twin (model) of instructing device (A) to contextual cloud (C) for processing by instructed device (B) and/or contextual cloud (C). |
| B→C | Provision of contextual information from instructed device (B) to contextual cloud (C) for; instructing device (A) based on request; and/or storage for possible later use. | Alternatively or in addition, provision of data from instructed device (B) and/or Digital Twin (model) of instructed device (B) to contextual cloud (C) for processing by instructing device (A) and/or contextual cloud (C). |
| C→B | Provision of contextual information from contextual cloud (C) to instructed device (B) about instructing device (A). | Alternatively or in addition, sending commands and/or configurations to device (B) based on instructions and/or requests originating from device (A) and with processing performed in contextual cloud. Processing can include: instructions; contextual information (a digital twin of device (A) and/or device (B)); ambiguity estimation. |

Present embodiments relate to two aspect in connection with contextual information. One aspect is how to generate contextual information to be available for a wireless communication scenario and one aspect is how to provide contextual information in the wireless communication scenario. As a wireless communication scenario, one may understand a wireless communication network that is not necessarily limited to the network structure itself. Possibly but not necessarily, a wireless communication scenario may include sources of information and/or influences that do not form a part of the wireless communication network or are controlled by a network structure. Examples may be, for example, external influences such as scatterers, environmental parameters, interfering devices belonging to a different network or radio access technology, RAT, reflectors or smart repeaters including reconfigurable intelligent surfaces that possibly provide for service or functionality controlled by a different, external entity or the like.

Figure 7:
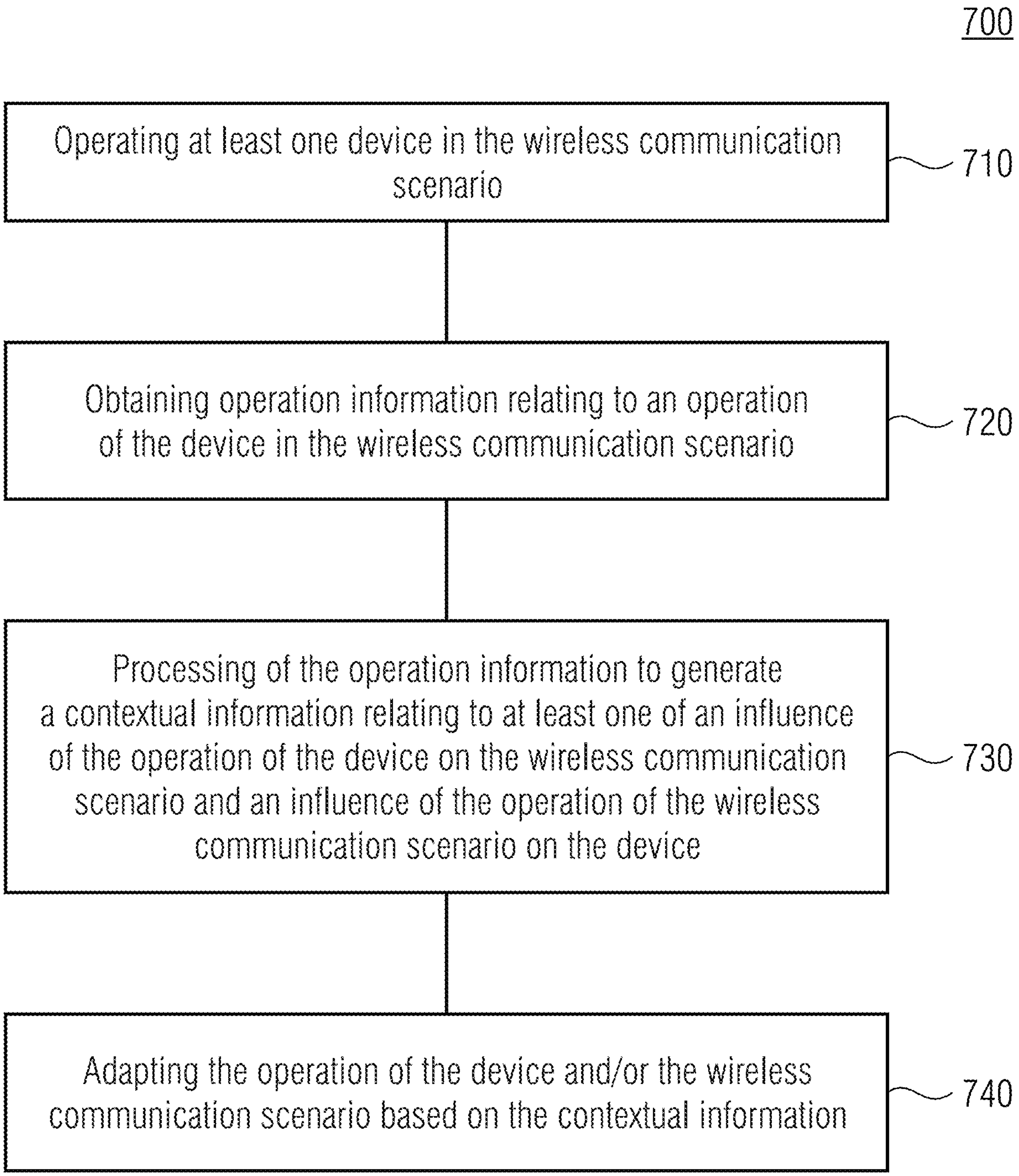
FIG. 7 shows a schematic flow chart of a method according to an embodiment.

With regard to the first aspect, embodiments provide for a method for operating a wireless communication scenario. FIG. 7 shows a schematic flow chart of such a method 700. A step 710 comprises operating at least one device in the wireless communication scenario, e.g., device 12 and/or device 14. To operate at least one device in the wireless communication scenario may relate, for example, to operate a beam under one or more power constraints. Alternatively or in addition, this may relate to observing output/input parameters or determining/knowing input parameter.

A step 720 comprises obtaining operation information relating to an operation of the device in the wireless communication scenario. Obtaining 720 may comprise to receive such information at one or more entities. Alternatively or in addition, obtaining operation information may comprise to perform measurements, e.g., to observe an output/input parameter, to determine or know input parameters, to determine an influence in the input/output behavior, i.e., to determine the input/output relationship. The relationship may be a recognized influence or a change or variation of such a relationship, i.e., on how the change of the input parameter changes the output parameter. Such broad terms as input parameter and output parameter may relate to various aspects of the operation of the device, e.g., to indicate a beam pattern as an input parameter and a generated beam pattern obtained as an output parameter. Other input parameters may relate to one or more resources or resource sets to be used, a timing or message to be included or information to be processed or provided. An associated output parameter may be an obtained behavior of the device responsive to the input parameter.

A step 730 of method 700 comprises processing the operation information to generate a contextual information relating to at least one of an influence of the operation of the device on the wireless communication scenario and an influence of the operation of the wireless communication scenario on the device. That is, the contextual information may indicate a unidirectional or bidirectional influence of an operation of one of the device and the wireless communication scenario on the other. For example, such an influence may be considered to relate to varying levels of interference based on different positions of a UE in the wireless communication network but may also relate to varying constraints with regard to selected power levels or the like based on other parameters such as time. A contextual information may comprise, as a non-limiting example only, information that a level of interference deviates from a reference value during specific times, e.g., based on an increase or decrease of traffic or presence of UEs. Such a deviation of traffic may affect the possibility to use resources and/or a required power level and/or other operational parameters that may be reflected in the contextual information. For example, the contextual information may relate to an output parameter to be controlled and may indicate for example, that an entity is allowed to operate or implement or behave according to a specific rule and/or to indicate that the device is not allowed to implement a different function. Therefore, contextual information may relate to a functional dependency. For example, when referring to any parameter, e.g., power of radiation, interference, mobility or the like, a contextual information may, when considering a possible value between 0 and 10 that the selected range is from 0 to 3 from said possible range.

A step 740 of method 700 comprises adapting the operation of the device and/or the wireless communication scenario based on the contextual information.

Processing 730 may also relate to feedback information from the instructed device to the network. For example, a behavior of the device, e.g., selected beams, selected power levels, a position, traffic requirements or the like, may be observed and stored as a part of the contextual information.

Method 700 relates to determine or detect the influence. The influence may be an intended or controlled effect within the network which may allow to at least partly control the influence. However, the influence may also be, at least in parts, unintended or an unintended effect that is not subject to a direct control. However, a recognition of such an influence may allow to react properly, e.g., in view of adapting the input parameter correspondingly and/or vice versa. Embodiments relate to recognizing the influence, to be aware of the influence and to become aware of the influence.

A method described herein may be implemented that the contextual information at least partly defines a functional relationship between an input parameter of the operation and an output parameter of the operation, such that adapting the operation of the device comprises determining a target behavior of at least a part of the wireless communication scenario and determining, using the contextual information and using a processor unit of the wireless communication scenario, a target output parameter of the operation, the target output parameter correlated with the target behavior. The method may also comprise using the contextual information and the processor unit to derive, from the target output parameter a target input parameter of the operation based on a functional relationship between the input parameter of the operation and the output parameter of the operation, the functional relationship defined at least in parts by the contextual information, such that the output parameter is associated with the operation. The method may comprise adapting the operation according to the target input parameter so as to obtain an influence of the operation on the wireless communication scenario that is in accordance with the target behavior.

The target behavior or target system behavior relates to a behavior of at least one device, of a set of devices, a subset of the wireless communication scenario or the overall wireless communication scenario.

Recognizing or becoming aware of the influence may be based on measurements performed in the wireless communication scenario and by evaluating perspective data. This may be implemented by use of a specific measurement procedure and/or by evaluating measurement data obtained from the deployed wireless communication scenario. Whilst recognizing the influence may be based on a sensing procedure, the device may also become a whereby receiving information/signals that allow to recognize an influence. Recognizing may be used, in connection with some embodiments, as a synonym for becoming aware, however, both items may lead to a situation or status of being aware.

According to an embodiment, the operation information may relate to an input information associated with an input parameter for the operation of the device and/or an output information associated with an output parameter for the operation of the device.

Input parameters on the one hand and output parameters on the other hand may be associated with each other, e.g., in a device-specific or operation-specific manner. As non-limiting example for such embodiments, the following scenario is described:

A BS may transmit to a receiving node such as a UE or a different BS while its beamformer is causing interference to another UE. A possible task may be to maintain a signal level on the wanted link to the receiving node above a certain threshold while reducing the interference to the other UE. Within such a scenario an input parameter may comprise one or more of:

- one or more low level input parameters such as gain settings, MCS, main lobe direction, placing of null into a specific directions, etc.; and/or
- one or more high level input parameters such as "maintain link capacity while reducing interference to other UE"

An output parameter may comprise one or more of:

- one or more low level input parameters such as RSRP, RSSI, BER, SINR, CNR, SIR, SNR etc.; and/or
- one or more high level output parameters such as throughput, link robustness, link level performance metrics According to an embodiment, the considered influence may relate to wireless signals transmitted and/or received in the wireless communication scenario. Alternatively, or in addition, the influence may relate to an availability of a path component in a multipath propagation environment of the wireless communication scenario. For example, such multipath components may be available, e.g., being based on a reflector or a RIS during some specific time instances or based on other conditions, e.g., paying a fee or the like and/or the available may depend on a position of other objects in the wireless communication scenario.

A wireless signal being transmitted in a wireless communication scenario may relate to at least one of a control signal, a command signal, a communication signal, a reporting signal, a random access request signal, a forwarding signal, a feedback signal, a repetition signal, a synchronization signal, a calibration signal, a timing signal, an offset signal for time/frequency/phase/position/DOPPLER-delay/trajectory or the like, a pre-emption signal, a congestion signal, an occupation signal, an unavailability signal, a reference signal, a sounding signal, a training signal, an acknowledgement signal, a confirmation signal, an on/off-signal, a sleep signal, a wake-up signal, an (DE) activation signal, a transfer signal, an acceptance signal, a rejection signal, a counting signal, a multi-hop, a time-to-live signal, an address signal, an availability signal, an identification signal, a capacity signal, a positioning signal, a warning signal, an emergency signal, an interference signal or interference, a contextual information signal or the like.

According to an embodiment, the influence is an intended or a non-intended functional relationship between an input parameter of the operation and an output parameter of the operation. The contextual information may at least partly define or reflect the functional relationship. Adapting the operation in step 740 may comprise using the contextual information to determine a target output parameter of the operation and determining a matching input parameter of the target output parameter based on the contextual information. That is, in knowledge on which output parameter is to be obtained, a determination backwards may be performed by use of the contextual information to determine which input parameter should be used to arrive at the output parameter. Adapting 740 may also comprise providing instructions to the device and/or the wireless communication scenario, the instructions indicating the matching input parameter, e.g., to change the behavior or to arrive at the wanted behavior. In connection with the use of the contextual information, this may be understood as a prediction of an event and a knowledge what has to be done next or in future in order to achieve a final output/result. This may comprise to use the contextual information to determine a first output parameter, e.g., a response, from a first input parameter and to determine a matching second input parameter for a second output parameter. This may consider that sometimes a final response/behavior is not possible from the current state directly but the final state can be achieved by going over intermediate states or a kind of sequence of states of the instructed device or the wireless communication scenario based on a sort of sequences of states which follow from a sequence of commands/inputs.

According to an embodiment, the influence considered in method 700 is an intended or non-intended functional relationship between an input parameter of the operation and an output parameter of the operation. The contextual information at least partly defines the functional relationship. Adapting 740 may comprise operating a processor unit, e.g., in one or more of the entities described herein, to use the contextual information to determine a target output parameter of the operation and for determining, from the target output parameter and by use of the contextual information, an intermediate input parameter that leads, when changing the input parameter to the intermediate input parameter, the output parameter to approach the target output parameter. Method 700 may additionally comprise operating the processor unit to determine, from the intermediate input parameter an intermediate output parameter, e.g., using contextual information and for determining a matching input parameter for the intermediate output parameter. The method may comprise to provide instructions to the device and/or the wireless communication scenario, the instructions indicating the matching input parameter. Such a method may be performed such that by implementing the instructions, the intermediate output parameter is obtained, leading to the intermediate input parameter and thereby to the target output parameter. That is, the sequence to be followed may be pre-defined or may be evaluated, e.g., by defining a sort of strategy or the like, step-by-step, e.g., based on intermediate results. Such a development of a strategy may be implemented by use of artificial intelligence or machine learning that comprise one or more hidden layers and that are learned by use of actual, past or recent measurement results and/or past behaviors/output parameters obtained by changing the input parameter and/or by considering the provided instructions.

With regard to artificial intelligence and/or machine learning that may be used in embodiments described herein, embodiments exploit the finding that large amount of data and/or complex relationships may be revealed by using said mechanisms. In connection with embodiments, the following may apply, at least in parts:

Artificial Intelligence (AI) is a field of computer science that aims to create intelligent machines that work and think like humans. This involves developing algorithms and computer programs that can learn from and make decisions based on data. Typically speaking, the choice of how to implement an AI solution is based on a specific application. Some of the common AI implementation methods include:

1. Machine Learning: uses algorithms and statistical models to analyse data and derive or learn patterns that can be used to make predictions and decisions.
2. Natural Language Processing: teaches computer programs to understand and interpret human language, allowing for the creation of chatbots, virtual assistants, and other conversational agents.
3. Computer Vision: develops algorithms that can analyse and understand visual data, allowing computers to "see" and interpret images and video.
4. Robotics: develops robots and other devices that can operate autonomously and make decisions based on their environment.

Of the methods listed above, Machine Learning is the most relevant to the embodiments, described herein and is recognized as a subset of AI that enables computer programs to automatically learn and improve from experience without being explicitly programmed. It involves the use of algorithms and statistical models to identify patterns in data and make decisions or predictions based on that data.

Deep Learning (DL) is a type of ML that uses artificial neural networks to learn and make decisions in a manner similar to human brain function. It involves the use of neural networks with multiple layers that allow for more complex representations of data, enabling models to recognize patterns in large datasets and achieve high levels of accuracy.

In essence, DL is a type of ML that employs neural networks with multiple layers, while ML is a broader term that includes many other techniques for training models to perform tasks using data without being explicitly programmed. Embodiments relate to a cloud entity, e.g., for deciding whether to use a digital twin or not and/or for other purposes based on machine learning. Such a cloud entity may employ or operate a neural network, e.g., an artificial neural network, having an input layer and an output layer and at least one hidden layer. A training of said neural network may incorporate on or more learning strategies as described herein.

Neural Networks are a type of computing system that are modelled after the structure and function of the biological neural networks in the human brain. They consist of a large number of processing nodes, connected by weights that define the strength of the connections between nodes. By combining signals from many nodes, neural networks are able to learn to recognize patterns and make predictions or decisions based on input data.

Artificial Neural Networks (ANNs) are a specific type of neural network that are used in machine learning and other areas of artificial intelligence and consist of layers of artificial neurons, each of which uses an activation function to produce an output based on its input. By adjusting the weights between neurons based on training data, neural networks can learn to perform tasks such as image classification, speech recognition, and natural language processing. There are many different types of artificial neural networks (ANNs), each of which is optimized for specific types of data and tasks. Some common types of ANNs include:

1. A Feedforward Neural Network (FNN) is the most basic type of artificial neural network in which the connections between the nodes do not form a cycle. In other words, the neural network architecture consists of a set of input nodes, one or more hidden layers of nodes, and an output layer of nodes, with each layer being fully connected to the next layer in a forward direction. The input data flows through the network in a single direction, starting from the input layer, passing through the hidden layers, and producing an output at the final layer.

2. A Convolutional Neural Network (CNN) is a type of artificial neural network commonly used in computer vision and image processing applications which is designed to recognize patterns in image data by processing its convolutional layers.

In a CNN, input images may undergo a series of convolutions in which filters apply transformation over small pixel blocks to extract features such as edges, shapes, and textures. These transformed images are then passed through additional layers such as pooling and fully connected layers to classify the image into one of several possible categories.

CNNs have the ability to automatically learn and extract features from raw image data, making them highly effective in tasks such as object recognition, image classification, and image segmentation.

3. A recurrent neural network (RNN) is a type of artificial neural network commonly used in machine learning applications that involve sequential data or time series data. It is designed to process input data that is arranged in a sequence, such as a sentence of text or a time-series of sensor data. Unlike feedforward neural networks, RNNs have connections between nodes that allow for feedback, allowing the network to retain information about previous inputs and output. This property makes RNNs highly effective in applications such as speech recognition, language modelling, and sentiment analysis of text. RNNs can be used in a variety of forms, including vanilla RNNs, Long Short-Term Memory (LSTM) networks, and Gated Recurrent Units (GRUs).

4. Long Short-Term Memory (LSTM) is a type of recurrent neural network (RNN) architecture specifically designed to handle the issue of vanishing gradient and the short-term memory problem in traditional RNNs. It can retain long-term dependencies in sequential data, making it an effective choice for applications like speech recognition, natural language processing, and time-series analysis.

LSTM networks use a memory cell, which is effectively a set of gates that control when the cell is written to or read from. The gates can control the current memory state, the previous memory state, and the current input to determine how much memory should be kept, forgotten or added to the current memory. This flexible and dynamic memory mechanism allows the LSTM network to learn and predict patterns in sequential data by selectively storing, ignoring, or updating information from past inputs.

5. An autoencoder is a type of artificial neural network used for unsupervised learning, which learns to efficiently represent data in a compressed form through its encoding layers. The network architecture of an autoencoder consists of an input layer, an encoder layer, and a decoder layer. The encoder layer compresses the input data and the decoder layer attempts to reconstruct the input data from the compressed representation generated by the encoder. During training, an autoencoder is typically trained to minimize the reconstruction error between the original input and the output generated by the decoder layer. Autoencoders can be used for various tasks, such as noise reduction, data compression, dimensionality reduction, and image denoising.

6. Generative Adversarial Networks (GANs) are a class of deep learning framework used for generative modelling. GANs consist of two neural networks—a generator network and a discriminator network—that are trained together in an adversarial setting. The generator network is designed to generate synthetic data that is similar to the real data, while the discriminator network is designed to distinguish between the real and synthetic data. During training, the generator and discriminator networks play a two-player minimax game, in which the generator tries to produce realistic synthetic data that can fool the discriminator, and the discriminator tries to correctly identify the synthetic data generated by the generator. Over time, the generator becomes better at generating realistic data, while the discriminator becomes better at distinguishing between real and synthetic data.

Beside those examples, other types of ANNs exist. Each type has its own strengths and weaknesses, and the choice of which type to use depends on the task at hand and the characteristics of the data being analysed.

When it comes to optimizing the performance of a communication network or system, there are several machine learning algorithms and techniques that can be used. One approach is to use reinforcement learning, which enables models to learn from their own experience and continually improve their performance through trial and error. Other methods such as feedforward neural networks, convolutional neural networks, and recurrent neural networks can also be used as an alternative or in addition within embodiments to model and optimize the behaviour of complex communication networks.

In addition or as an alternative to traditional machine learning techniques, newer approaches like deep reinforcement learning and meta-learning are also showing promise in the field of communication network optimization. Ultimately, the choice of which machine learning approach to use depends on the specific optimization problem at hand and the characteristics of the data being analysed.

Deep reinforcement learning (Deep RL) is a subspace of machine learning that combines the ideas of reinforcement learning (RL) with deep learning and enables software agents to learn from their own experiences and improve their behaviour over time through trial and error.

In Deep RL, an artificial neural network is used to approximate the value of actions taken by an agent in a given environment, allowing the agent to take actions with a higher expected reward. Through iterative interactions with its environment, the agent learns the optimal policy, which is a mapping from states to actions that maximizes cumulative reward over time.

Meta-learning refers to the process of learning how to learn. It is a subfield of machine learning that involves developing algorithms and models that can automatically learn from data and adapt to new tasks and environments with minimal human intervention. Meta-learning aims to improve the efficiency and effectiveness of the learning process by enabling models to learn from previous learning experiences and leverage that knowledge to accelerate the learning process for new tasks.

Figure 8:
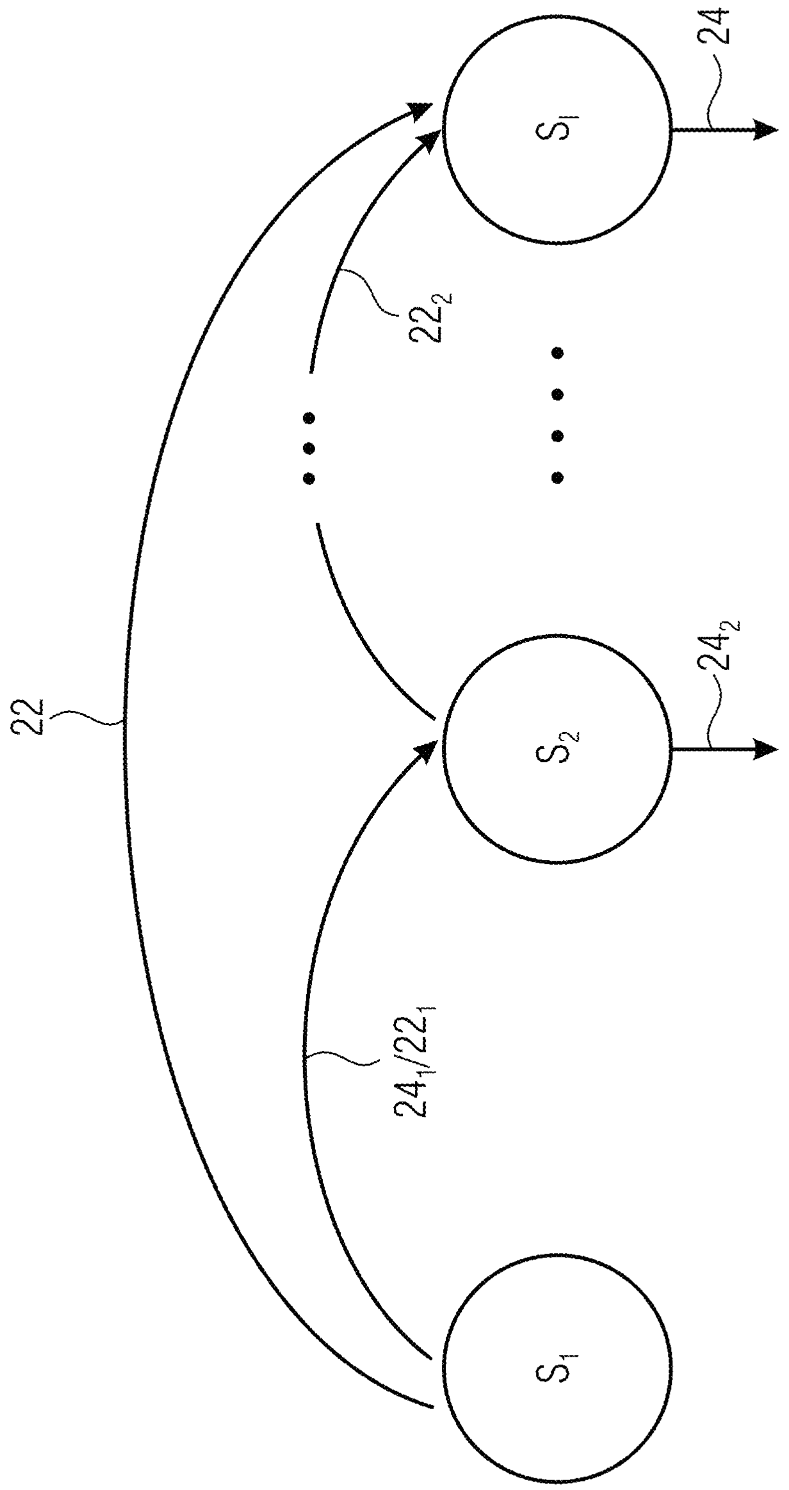
FIG. 8 shows a schematic block diagram of different system states to be obtain according to embodiments described herein.

FIG. 8 shows a schematic block diagram of different states $S_i$ with i=1, . . . . I with I being at least of value 2. To arrive at target state $S_I$, it may be possible to provide for a specific input parameter 22 to obtain state $S_I$ that provides for the aimed output parameter 24. However, when state $S_I$ may not be obtained directly due to a lack of information or due to a lack of a possibility to control, at least one intermediate state $S_2$ may be used starting from initial state $S_1$ by providing an input parameter $\mathbf{24}_1$ that may also be an input parameter $\mathbf{22}_1$ for state $S_2$ or the respective device to provide for an output parameter $\mathbf{24}_2$ associated with state $S_2$.

Said output parameter $\mathbf{24}_2$ may at least form a basis to obtain an input parameter $\mathbf{22}_2$ to arrive at state $S_I$. For example, such a sequential provision of input parameters to obtain output parameters may comprise to select an example antenna panel from a plurality of antenna panels that may be controlled similarly but deviate in view of an availability of multipath components. To obtain a final beam along a specific direction, an intermediate state may comprise an evaluation to set the wireless communication scenario into a condition where said multipath component is available, e.g., moving a blocking object and/or rotating the antenna panel or the like.

According to an embodiment, method 700 may comprise obtaining the intermediate input parameter based on an evaluation that is related to the input parameter, the output parameter and/or the contextual information to obtain a first evaluation result. The output parameter may relate to a sort of system response of the wireless communication scenario. Based thereon, the intermediate input parameter may be derived from the first evaluation result. Alternatively or in addition, the intermediate output parameter may be obtained based on an evaluation that is related to the input parameter, the output parameter and/or the contextual information to obtain a second evaluation result. The intermediate input parameter may be derived from the second evaluation result. That is, by evaluating an input parameter and/or an output parameter intermediate input parameters $\mathbf{22}_1$ and/or $\mathbf{22}_2$ may be derived.

According to an embodiment, the evaluation may be related to at least one of an estimation or prediction of a future value, an estimation of prediction of a convergence in future, a result representing an evolution, a deviation or departure from a reference value, a tendency or trend, e.g., an extrapolation, a tracing or tacking, an aging, a quantization, a stability and/or a validity of the input parameter and/or the output parameter and/or of the contextual information.

For example, the method may comprise to measure, at different instances of time and using at least one sensor unit, a set of parameters of the wireless communication scenario to obtain a plurality of measurement results. The method may comprise analyzing the plurality of measurement results to obtain information indicating the influence. Such an analyzing may comprise an evaluation of a condition of the wireless communication scenario, at least one input parameter and/or at least one output parameter of the wireless communication scenario. The method may be performed such that a processing 730 is based on the plurality of measurement results. In other words, by use of at least one sensor unit and by measuring a set of parameters of the wireless communication scenario, the method comprises to learn the influence, i.e., the input/output relationship in the wireless communication scenario to allow provision of such information to other entities in the network.

According to an embodiment, at different locations in space and using at least one sensor unit, a set of at least one parameter of the wireless communication scenario is measured to obtain a plurality of measurement results. The plurality of measurement results is analyzed to obtain information indicating the influence such that processing 730 of the operation information is based on the plurality of measurement results being obtained at different locations in space. As an alternative or in addition to use different locations in space, different orientations of a measuring device in space may be used to obtain the plurality of measurement results.

As a further alternative or in addition to the above-described measurements, the method may comprise to measure, in different directions and using at least one sensor unit, a set of parameters of the wireless communication scenario to obtain a plurality of measurement results that are analyzed to obtain the information indicating the influence.

Such a determination of the influence based on measurement data may form a basis for machine learning and artificial intelligence components in the wireless communication scenario. For example, a method in accordance with embodiments may relate to an operation information that comprises a plurality of pieces of information, each piece of information related to a condition or a parameter of the wireless communication scenario, e.g., measured in the above-described way. As an alternative or in addition, a piece of information may be related to a command, a message or a signal transmitted in the wireless communication scenario. Such information may be obtained by measurements and/or knowledge and/or monitoring the wireless communication network or scenario. The processing 730 may be executed to comprise commonly using the plurality of pieces of information to determine the influence. For example, such a common use may relate to a combination of pieces of information. For example, the method may comprise to correlate, to average, to filter, to window, to select, to weight, to prioritize, to blank, to decimate, to interpolate, to extrapolate, to curve-fit the pieces of information, to perform a pivotal analyzing, to reduce or compact the information, to expand the information, to analyze the information and/or to iteratively process the information.

According to an embodiment, the method comprises to measure the condition or parameter using a sensor unit to obtain the operation information as described above.

For example, the plurality of pieces of information may be related to physical parameters of different dimensions such as power, location, temperature, angular momentum or the like and the contextual information may relate to the influence of at least one of the physical parameters on the operation and/or related to the influence of the operation on at least one of the physical parameters. That is, possibly but not limited hereto and in particular more than only a signal-to-noise-ratio or bit-failure correlation is determined.

According to an embodiment, processing 730 may comprise to determine at least a part of the influence during a runtime of the wireless communication scenario based on an analysis executed on a variation of the operation information related to a same parameter of the wireless communication scenario. That is, the influence may be determined by observing an effect of a variation of the operation information of a parameter.

According to an embodiment, such a method may comprise to derive, using the contextual information, a command for the device and/or a different apparatus of the wireless communication scenario to control at least a part of the wireless communication scenario.

FIG. 9 shows a schematic flow chart of a method 900 for operating a wireless communication scenario using contextual information and in accordance with an embodiment. A step 910 comprises operating at least one device in the wireless communication scenario, see, for example, FIG. 6. A step 920 comprises operating a database comprising contextual information relating to at least one of an influence of the operation of the device on the wireless communication scenario and an influence of the operation of the wireless communication scenario on the device. For example, the contextual information obtained by use of method 700 may be stored in the database. The influence of method 900 is a functional relationship between an input parameter of the operation and an output parameter of the operation.

A step 930 comprises determining a target behavior of the device and/or of the wireless communication scenario. Such a target behavior of the device may be, for example, a maximization of data throughput, a minimization of energy consumption, a minimization of perceived or caused interference and/or an optimization along with other parameters. Embodiments are, however, not limited to such example. With regard to the wireless communication scenario, a target behavior may relate, amongst other things, to a provision of communication to a high number of devices, a specific quality of service for one or more devices, a consideration or minimization of interference to other scenarios or networks or the like. A step 940 may comprise using the contextual information to generate a command for the device and/or a different apparatus of the wireless communication scenario as a receiving entity to instruct the receiving entity to apply an input parameter to obtain the target behavior.

In method 900, for example, step 940 to generate the command may comprise a use of a digital twin, DT, of at least a part of the wireless communication scenario and/or of the device as a twinned entity, to derive, based on the target behavior of the twinned entity and based on a condition of the twinned entity indicated by the contextual information, a state of the twinned entity that corresponds to the target system behavior. The method may comprise to determine the command to cause the twinned entity to the state. Alternatively or in addition, the method may comprise to use a database having stored therein a plurality of database entries, wherein at least a subset of the plurality of database entries associates a condition with information indicating a command, the method comprising providing a condition of the at least part of the wireless communication scenario indicated by the contextual information to obtain the associated instruction.

This is explained in the following in more detail:

Contextual Information

Since some pieces of contextual information can age—because for example the data provided to the cloud is outdated or has not been processed or converted into information—and might have aged more or less than other pieces of contextual information, the combination of such pieces of CI should match or fall within a "fitting margin". For example, the digital twin of device A might be associated with a software release that is different to that of device B. This might necessitate the matching of software, drivers or commands between different entities. When combining the CI derived from or provided by different entities, it is important to determine how fresh it is or at least of a similar vintage.

The Digital Shadow

Figure 10:
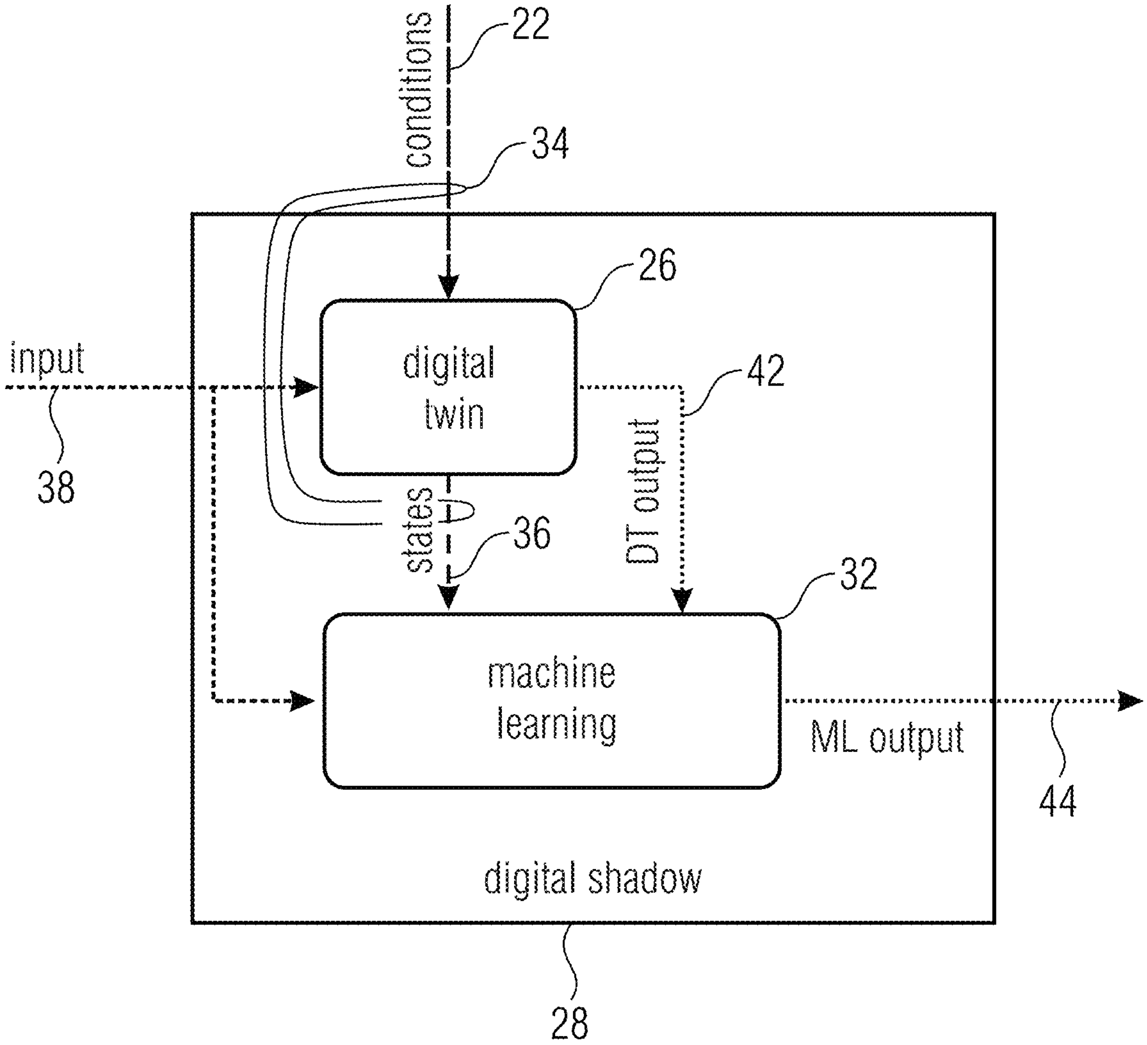
FIG. 10 shows a schematic representation of a signal flow according to an embodiment and within a part of a wireless communication scenario.

FIG. 10 shows a schematic representation of a signal flow according to an embodiment and within a part of a wireless communication scenario. Shown are functional models for a Digital Twin (DT) 26 and Digital Shadow (DS) 28 and further signal processing components not limited to include Machine Learning (ML) 32 and Artificial Intelligence (AI).

A digital shadow 32 of a system can be understood of as a particular snapshot represented in a piece of information generated by use of a processing entity such as a centralised or distributed calculation unit or processor. The piece of information may be not limited to only represent at a certain moment in time but may rely on a certain set of inputs, conditions and states and outputs. In other words, the digital shadow 28 may be understood as a projection of a plane or collections of planes that are cut through a multidimensional space comprised of input requests, configurations, states, a memory of events and chains of events and the resulting output. The inventors found that such a collection of parameters and their values in hyperspace would quite often contain too much information than is actually required for any given purpose. Embodiments therefore relate to shadows created for a subset of dimensions, e.g., some or all of a specific frequency bands, antenna beams, category of service, propagation conditions and the number of users served in a given sector of a given cell at given time on a given day.

As may be derived from FIG. 10, contextual information 34 may relate to an association of an input parameter 22, e.g., one or more conditions of the device or part of the wireless communication scenario, e.g., the twinned entity and a state 36 that is explained, for example, in connection with FIG. 8.

In other words, FIG. 10 shows a relationship between contextual information 34 (conditions; states), a Digital Twin (DT) 26, a Digital Shadow (DS) 28 and Machine Learning 32/Artificial Intelligence (AI), each or all components being implementable partially or in full in a Context Cloud with processing capabilities. The DT 26 and/or the ML 32 may receive input 38, wherein the DT may provide, in addition to the at least one state 36 a DT output 42, i.e., a modelled output of the twinned entity that may allow ML 32 to learn the relationship between input 38 and the relationship between condition 22 and state 36 mapped in contextual information, CI, 34 to provide for an ML output 44, i.e., a learning result. With regard to inputs and conditions, an input may be understood, in connection with embodiments, as a target, a goal, a desired action and/or a command, while a condition may frame the degrees of freedom to process to inputs towards final outputs.

It is to be noted that, the abbreviation AI/ML is used herein to denote an all-encompassing set of artificial intelligence (AI) and/or machine learning (ML) methods although description is provided to describe these methods. Furthermore, any mention of AI without ML and vice versa does not necessarily include or exclude any particular AI or ML method.

The entities described above can be used for at least one of the following:

- Simulate/emulate a system behaviour/a system response, e.g. of device B by using:
  - a DT of device B/a system and/or
  - Providing control/input parameters/variables to the DT and/or
  - Providing further parameters describing a condition or state the system/device B is in and/or
  - Observing/measuring output parameters from the DT, which describe the system behaviour in response to the input and the further input (condition)
- Provide input to a AI/ML entity of at least on of:
  - Input (control) parameters to the DT
  - Further input (condition) parameters to the DT
  - Output parameters (system response, states) from the DT
- Collect an input-output relationship or a set of control parameters or a simplified model of the DT (a sectional cut/a shadow of the DT) as an output from the ML/AI entity given the provided conditions, representing at least one of:

- A minimized/compressed set of commands which enables to control a system response in an efficient and effective manner;
- A simplified (projection of/shadow of) DT with reduced complexity to control the system behaviour under the given constraints (conditions)
- Prediction of validity of the DS to present an operable representation of the DT suitable to derive valid commands from it to control the system behaviour
- Prediction of estimation accuracy of the DS to represent the DT in terms of KPIs/metric relevant for the system response The above-mentioned models and signal processing entities/blocks can be implemented all or partially inside the contextual information cloud (C), device A or device B, leaving freedom at the implementation side.

As an example, if the above entities A & B are virtually (digitally) represented by for example DT_A, DT of instructing device A, and DT_B, i.e., DT of instructed device B, and these representations or, alternatively, at least some minimum contextual information about A & B are available inside the contextual information cloud (C), then the following use case scenarios can be envisioned/supported:

- The system response of device B causes an (undesired) effect on device A (for example, B is an aggressor causing undesired interference to A being a victim).
- Then C could interpret an observed receive signal situation with an undesired system behaviour which can and needs to be changed.
- C identifies that such system behaviour can be influenced/controlled by instructing A and/or B to change their RX behaviour (A) and/or TX behaviour (B).
- As a result C can provide an assistance, moderation or orchestration capability to achieve certain goals or certain system behaviour relevant for a communication system of at least A & B or A & B & "C" wherein "C" is a helper, assistant or enabler for an overall changed or optimized system behaviour.

A Generalization of the Digital Shadow Concept

Figure 11:
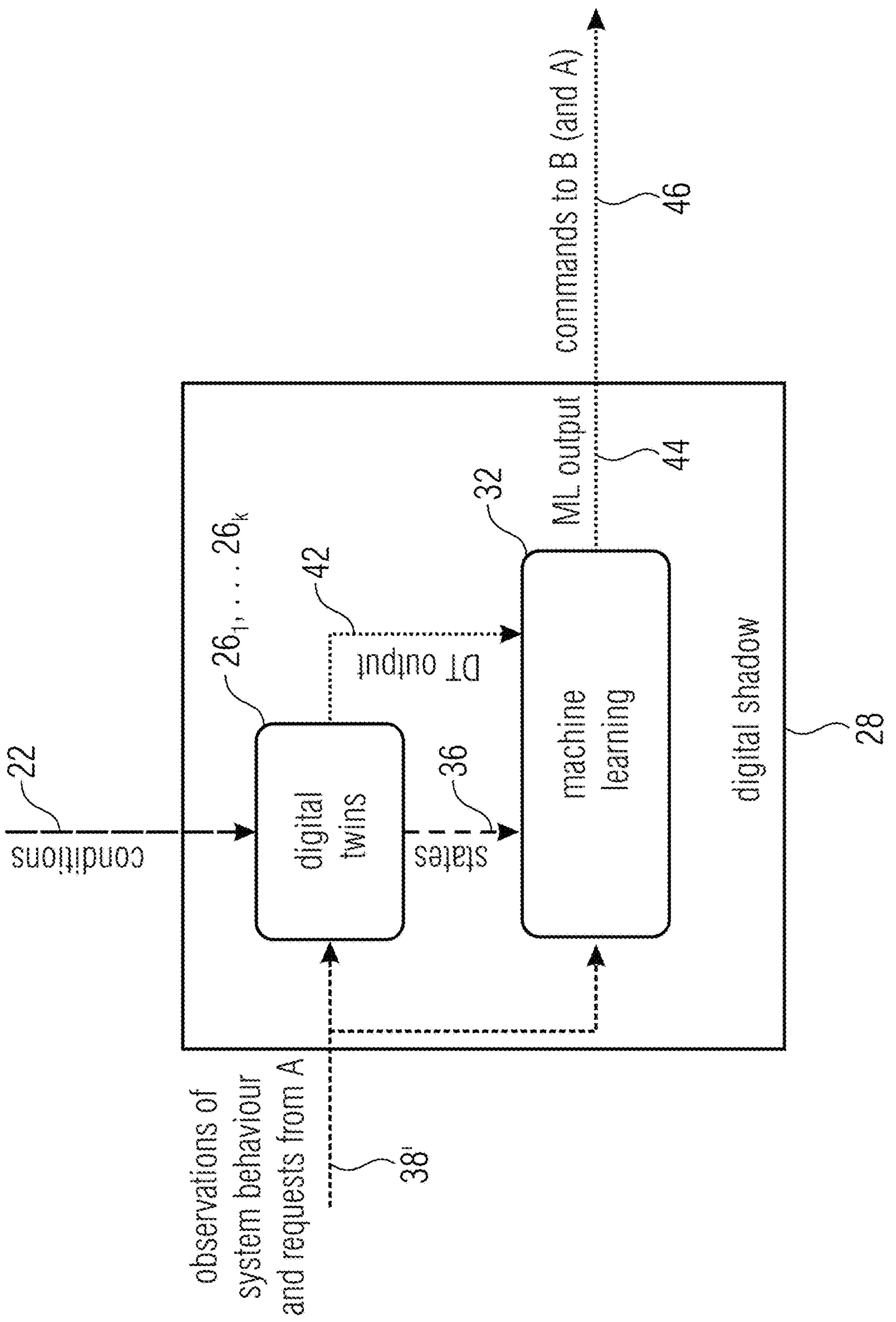
FIG. 11 shows a schematic block diagram of a contextual cloud according to an embodiment, using a digital shadow.

With further reference to the example of an interference scenario, FIG. 11 shows how the contextual cloud may be provided with observations of system behaviour by the many instructing devices A's and conditions not limited to include goals, constraints and performance metrics. The contextual cloud may process the inputs using one, a plurality of and/or a distributed processing unit, and optionally together with the digital twins $\mathbf{26}_1$ to $\mathbf{26}_k$, k>1 it may perform AI/ML which results in commands 46 that may be sent to specific B's and in some cases, specific A's. Here the A's are receiving devices (observers of observations 38' of the system behaviour) and the B's are transmitting devices (causing a change in system behaviour). In general, the digital twins may be associated with the A's and the B's that comprise the system together with the radio/propagation channel in between. The aforementioned interference scenario will be revisited later in connection with FIG. 21 where an example illustration of same is provided.

Alternative Contextual Cloud Concepts

Thus far, the digital shadow 28 has been illustrated (see FIG. 10 and FIG. 11) as having access to both digital twins 26 (of network entities) and machine learning functions 32. Since it may have, as an alternative or in addition, access to a database being available, these additional architectures will now be introduced, explain that the contextual cloud is capable of processing input requests, conditional information to provide an output that can affect system behaviour.

It should be noted that the digital shadow may be illustrated differently hereinafter. In the following, the function "Cloud with Context Information & Processing Capabilities" (CCIPC) may correspond, at least in parts with the digital shadow 28. This means that the functions or entities residing in this space have access to the CI provided by the CCIPC and/or provide data/requests/instructions/settings/system responses to the Cloud.

Figure 12:
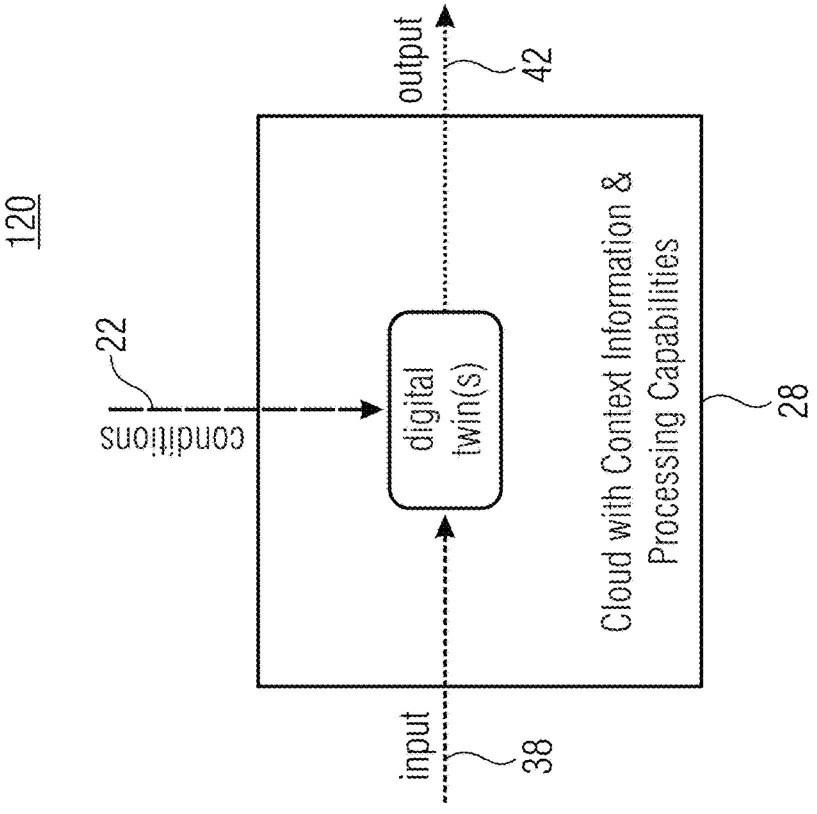
FIG. 12 shows a schematic block diagram of a contextual cloud according to an embodiment, using a digital twin.

Whilst considering the concept of the introduced CCIPC, the general usage of a digital twin such as that shown in FIG. 12 is illustrated, where a contextual cloud 120 according to an embodiment may comprise of one or more digital twins 28 and the processing means or units to derive the output 42 from some given specific inputs 38 and conditions 22 possibly without having to use artificial intelligence or machine learning. FIG. 12 thus shows the relationship between input (requests/instructions), contextual information (conditions; states), a Digital Twin (DT) and output (commands prepared for the instructed device and/or the instructing device.

Figure 13:
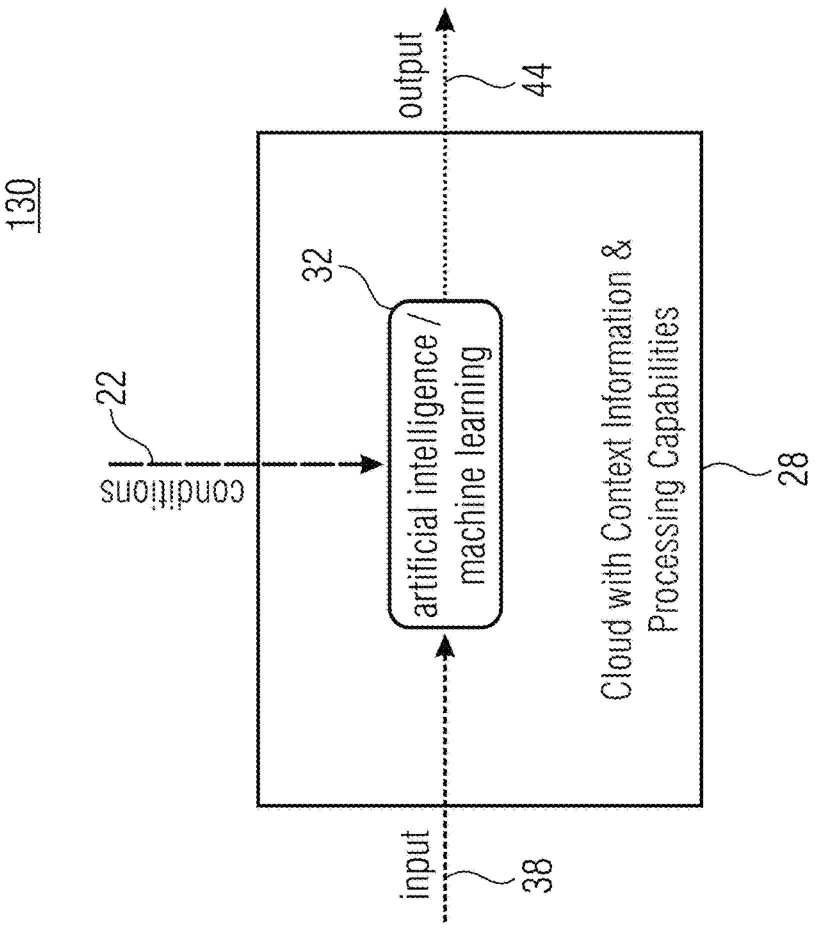
FIG. 13 shows a schematic block diagram of a contextual cloud according to an embodiment; using artificial intelligence.

In a contextual cloud 130 being shown in FIG. 13 as a schematic block diagram the contextual cloud 130 may use the artificial intelligence and/or machine learning 32 to derive an output 44 from some set of given specific inputs 38 and conditions 22. A digital twin is possibly not used. In FIG. 13 the relationship between input (requests/instructions), contextual information (conditions; states), an Artificial Intelligence/Machine learning process and output (commands prepared for the instructed device and/or the instructing device) is shown.

Figure 14:
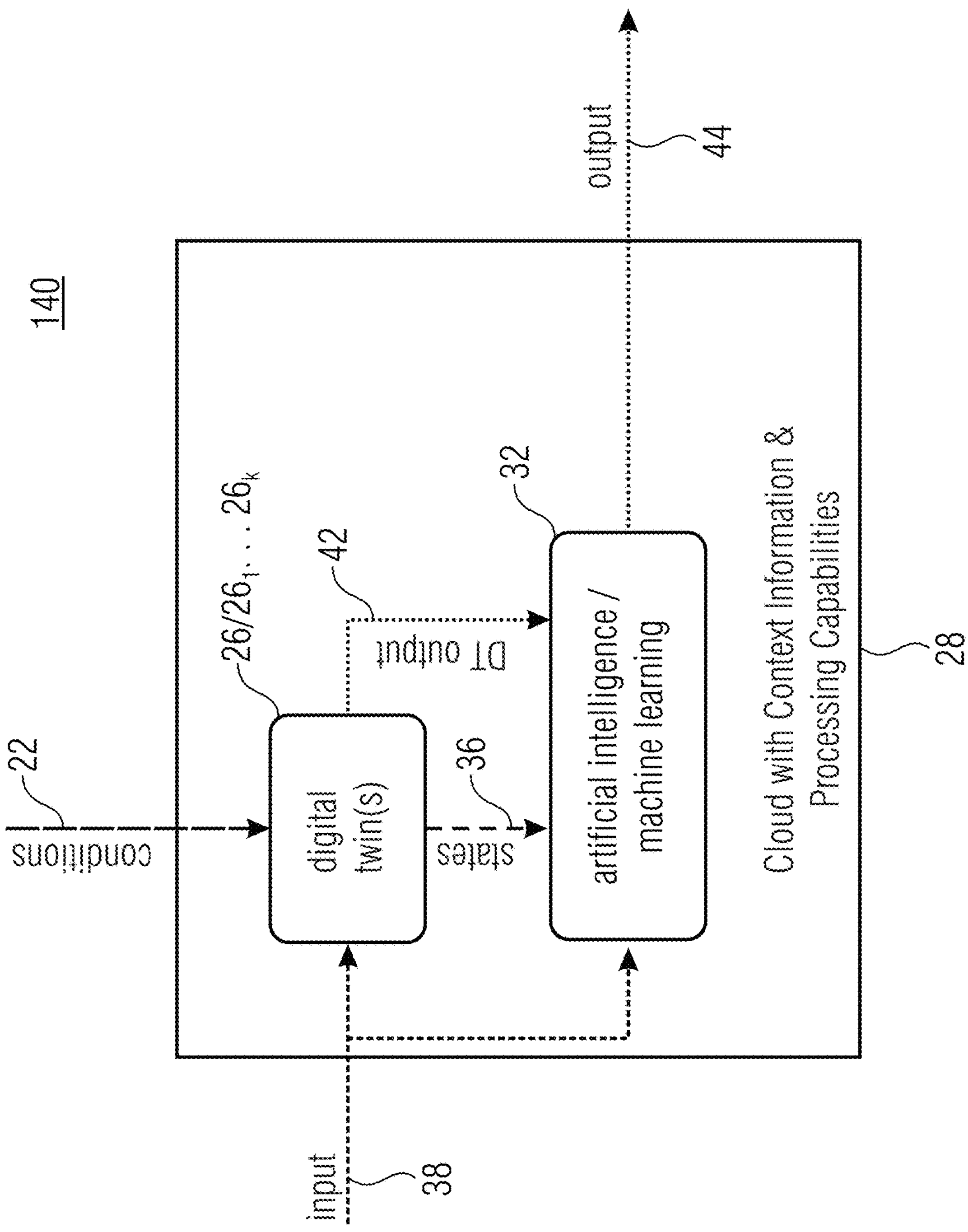
FIG. 14 shows a schematic block diagram of a functional combination of the cloud entities according to an embodiment.

FIG. 14 shows a schematic block diagram of a functional combination of the cloud entities 120 and 130 in which a contextual cloud 140 is now comprised of both one or more digital twins $\mathbf{26}/\mathbf{26}_1, \ldots, \mathbf{26}_k$ and artificial intelligence or machine learning capabilities. As before, these functions work on some set of inputs 38 and conditions 22 in order to provide an output 44 which can affect system behaviour. In other words, FIG. 14 shows the relationship between input (requests/instructions), contextual information (conditions; states), a Digital Twin, an Artificial Intelligence/Machine learning process and output (commands prepared for the instructed device and/or the instructing device).

However, since artificial intelligence and machine learning processes may require significant amounts of computation that can consume considerable quantities of both energy and time, it may be desirable to find solutions that may be implemented as an alternative or in addition with the machine learning 32.

Figure 15:
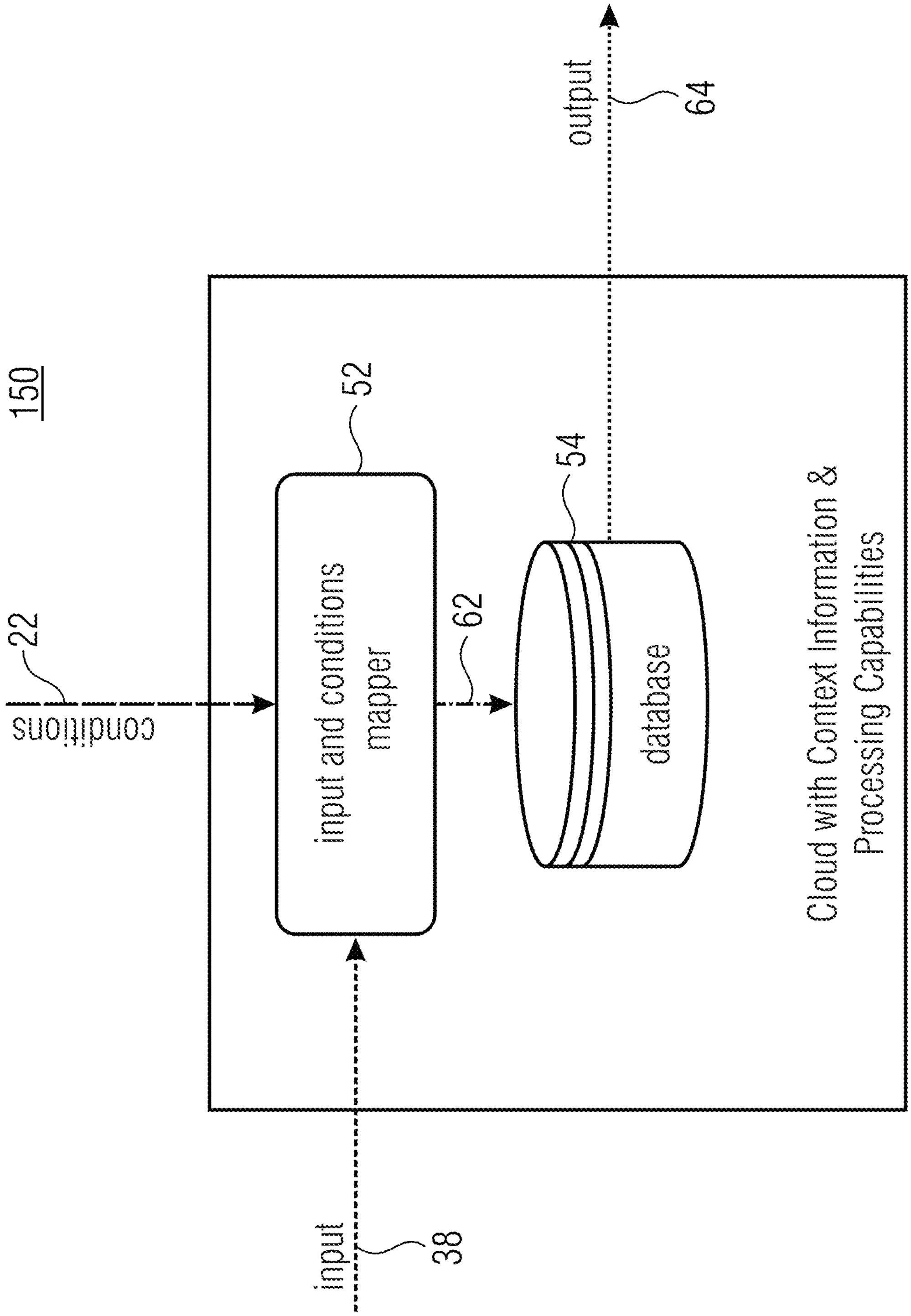
FIG. 15 shows a schematic block diagram of a cloud entity according to an embodiment, comprising an input/conditions mapper.

FIG. 15 shows a schematic block diagram of a cloud entity 150 according to an embodiment. The cloud entity may comprise an input/conditions mapper 52, e.g., a circuitry or processor adapted to map the system behavior indicating in input 38 and the target system behavior, e.g., conditions 22, to the target system to determine an entry of a database 54 that may be indicated with an information such as an index 62 of database 54. An output 64 of the database may indicate or form a basis to determine respective commands and/or instructions by way of a predetermined value. FIG. 15 illustrates an arrangement that may be implemented as an alternative or in addition to other could entities described herein in which the contextual cloud may be equipped with an input and conditions mapper functional block 52 and with a database block 54, e.g., a centralized and/or distributed data storage. The input and conditions mapper 52 may be adapted to resolve and/or translate the input 38 and/or condition 22 with which it is supplied into addresses and/or database locations, each of which stores an output 64, e.g., a command that is to be sent to an instructed and/or an instructing device. At an outside observer, the function of the mapper 52 may be likened to that of a codebook. In other words, FIG. 15 shows the relationship between input (request/instructions), contextual information (conditions), an input and conditions mapper, a database and output (commands prepared for the instructing device and/or the instructing device). The following requirements may be noted:

The mapper 52 may contain a record to the relationships between inputs, conditions and database locations, registries and entries; and The database may contain a set of commands that are adequate for effecting the desired system behavior through the control of the required network entities.

To fulfil the above requirements or preferences, the following options may be implemented separately, jointly, or in combination pre-programmed or connected to a third-party provider.

Yet another possibility in accordance with embodiments is to combine the virtues afforded by the various contextual cloud solutions concepts provided herein such that the database may be equipped with meaningful information as the result of earlier executions of the DT and AI/ML processors.

Figure 16:
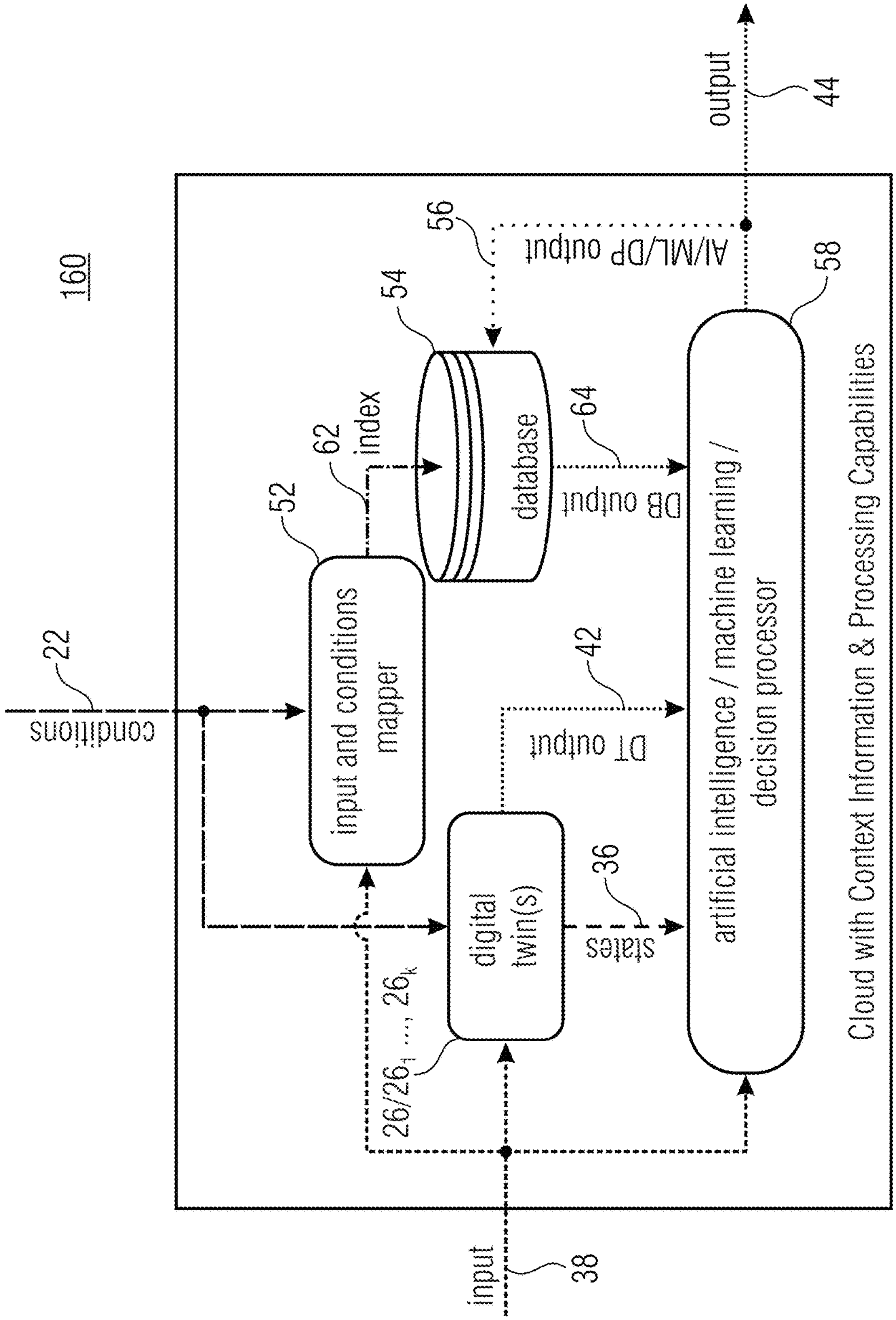
FIG. 16 shows a schematic block diagram of a cloud entity according to an embodiment, comprising at least one digital twin that may be used together with the input and condition mapper.

FIG. 16 shows a schematic block diagram of a cloud entity 160 according to an embodiment. Therein, at least one digital twin 26/26$_1$ . . . , 26$_k$ may be used together with the input and condition mapper 52. An artificial intelligence/machine learning/decision processor block 58 may receive the DT output 42 and database output 64 along with state information 36. Output 44 may be provided by AI/ML/DP 58 and a feedback being the ML output 44 or information derived thereof may be supplied to database 54. That is, an output 56 of KI/ML/DP 58 may be provided to database 54 to prepare the database. When compared to block 32 of FIG. 14, a decision processor functionality may be implemented by use of a processing unit to determine whether to use the at least one digital twin 26, the mapper 52, and/or database 54, the artificial intelligence and/or the machine learning, each as an individual decision or in combination with each other or not. Such a decision may be made in isolation for an individual block or in combination with one or more other blocks. The way in which decision processor 58 decides may be related to learning and the development of knowledge, both of which are explained herein.

In other words, FIG. 16 shows one possible relationship between input (requests/instructions), contextual information (conditions), one or more digital twins, an input and conditions mapper, a database, a combined artificial intelligence, machine learning and decision processor, an output (commands prepared to the instructed device and/or the instructing device).

Feedback Loops and the Flow of Data

The foregoing signal flow diagrams have illustrated, at least in parts, the manner in which data flows and hands how feedback loops may be created in accordance with embodiments. Such matters are now described in more detail:

Feedback Loop Between Requestor and Cloud

Here, the requestor may be a device requesting a change of system behavior subject to certain objectives, e.g., an increase in SINR, a decrease in power or the like. With reference to FIG. 6, this may be understood as device A but may also refer to device B, e.g., when the instructed device reaches performance limits. The feedback loop may be bidirectional: from C→A (request from A, C processes and response to A with interpretation, C asks A if the system response provided is adequate in value and/or planned); and/or from A→C (request from C, A provides feedback to C on measurements, adequacy of system response, ambiguity of interpreted requests).

Feedback Loop Between Observer and Cloud

Here the cloud may instruct one, several, or all observers to perform a defined set of measurements and may report (C→A and/or C→B). The feedback may be provided in the report wherein descriptors may provide for quality measures of the data contained therein (e.g., from A) and on the effectiveness of the actions (e.g., from B) or the overrun of limits (e.g., from B).

Different Types of Learning with the Contextual Information Cloud

As the contextual information cloud can be equipped with the means to collect data in relation to many events over time, e.g., for example, through the use of a storage and retrieval mechanism and/or a database, it may process or effectively filter the data stored therein and by doing so, create information. This may include a use of data storage units and/or processing units and/or filter units.

The distinction may be made between data and information. While the former, data, may be a collection of observations, the latter, information, may be the result of processing those observations in order to reveal or identify a pattern which can be described as information. Furthermore:

Data may be a raw and unorganized collection of observations that needs to be processed to be make it meaningful whereas information may be a set of data that has been processed in a meaningful way according to a given requirement;

data does not require to have any specific purpose whereas information may carry a meaning associated with the way in which the data has been interpreted;

data alone may have little or no significance while information may be significant in itself;

data may be independent of information whereas information is dependent on data.

Examples on the manner in which the data can be processed may comprise but is not limited to include:

The determination of first, second and higher order statistics, filtering, interpolation, decimation, aggregation, reduction and/or mapping;

machine learning including supervised learning, semi-supervised learning, unsupervised learning, reinforcement learning, hybrid learning, semi-supervised, self-supervised learning, multi-instance learning, inductive learning, inductive interference, transductive learning, multi-task learning, active learning, online learning, transfer learning and ensemble learning; and artificial intelligence (AI) based on capabilities including narrow AI, general AI and super AI; artificial intelligence based on functionalities including reactive machine, limited memory, theory of mind and self-awareness.

Learning the Meaning of Requests

Throughout the processing of requests (from A) and feedback provided by the requestor (A), the contextual cloud may learn the meaning of those requests.

Learning System Behavior

Through the processing of commands (to B) and feedback provided by the observers (A) the contextual cloud may learn how the system behaves, e.g., the input/output relationships.

Learning From Learning, the Development of Knowledge

By combining what has been learnt regarding the meaning of the request together with experience of how the system then behaves, the contextual cloud may acquire knowledge which can be used to improve the effectiveness and the ability to assist the communication system. To a human observer, the application of this knowledge may give the impression that the contextual cloud is able to "understand" the actions required to fulfill the requests given.

Methods of Learning and Methods of Execution

In connection with embodiments, the concept of learning and the concept of execution is introduced and methods of their implementation are presented.

Figure 17:
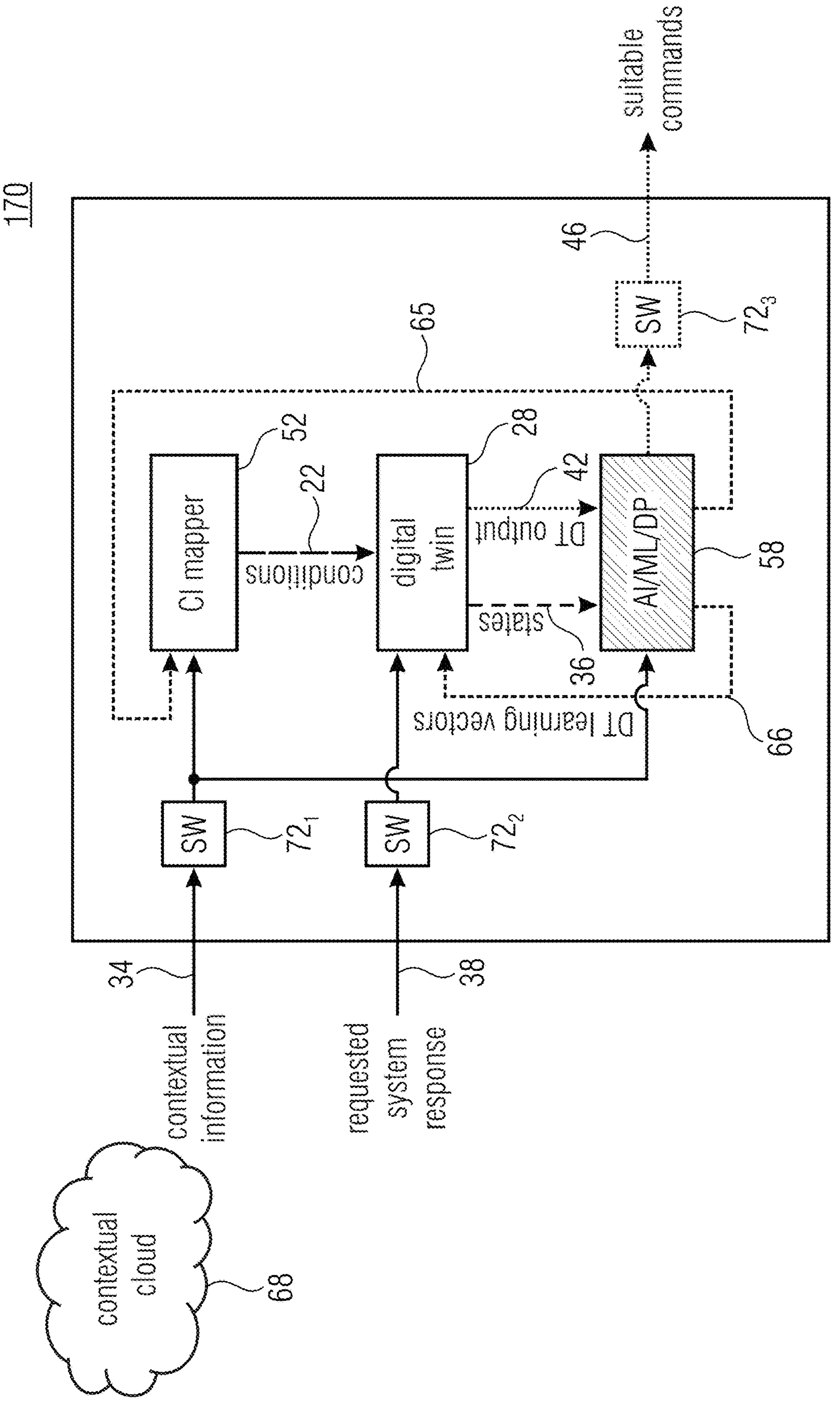
FIG. 17 shows a schematic block diagram of a cloud entity according to an embodiment that comprises a learning processing unit.

FIG. 17 shows a schematic block diagram of a cloud entity 170 that comprises a learning processing unit LPU, e.g., using blocks 32 and/or 58. FIG. 17 shows a structure that comprises some similarities with cloud entity 160 but comprises several important differences. A first difference is the position of the contextual cloud 68, here presented outside the container rather than inside.

A second difference is the inclusion of three switch blocks 72$_1$, 72$_2$ and 72$_3$ labelled "SW" which may be used to control the connection of inputs and/or output. For example, the AI/ML/DP 58 may control switches 72$_1$, 72$_2$ and/or 72$_3$ to connect or disconnect a respective interface or source of information.

A third difference is the use of additional signal flow paths 65 and 66, one labeled as "DT learning vector" 66 and the other as "CI learning vectors" 65 which may route an output of the AI/ML/DP block 58 to the input of the digital twin 28 and a different output of the AI/ML/DP block 58 to the input of the CI mapper 52. For example, a CI learning vector 65 may be used to train the CI mapper 52 together with the contextual information, CI. When compared to the CI learning vector 65, a DT learning vector 66 may be understood as learning vector which may be used to train the DT 28 together with the requested system response.

In other words, FIG. 17 shows a schematic block diagram to illustrate the interconnection of the functional blocks that may be used to perform learning and execution processes.

During a uniformed learning mode, the AI/ML/DP may be configured to: a) provide switch control signals that effectively disconnect the external input and/or output signal lines; and b) generate learning vectors that exercise the digital twin and/or the contextual information mapper.

During an execution mode, the AI/ML/DP may be configured to: a) provided switch control signals that effectively connect the external input and/or output signal lines; and b) use the decision processor to determine how the output of the AI/ML process and the output of the digital twin 28 are used, for example, only one or the other or alternatively, an either equal or unequal combination of the two.

Figure 18:
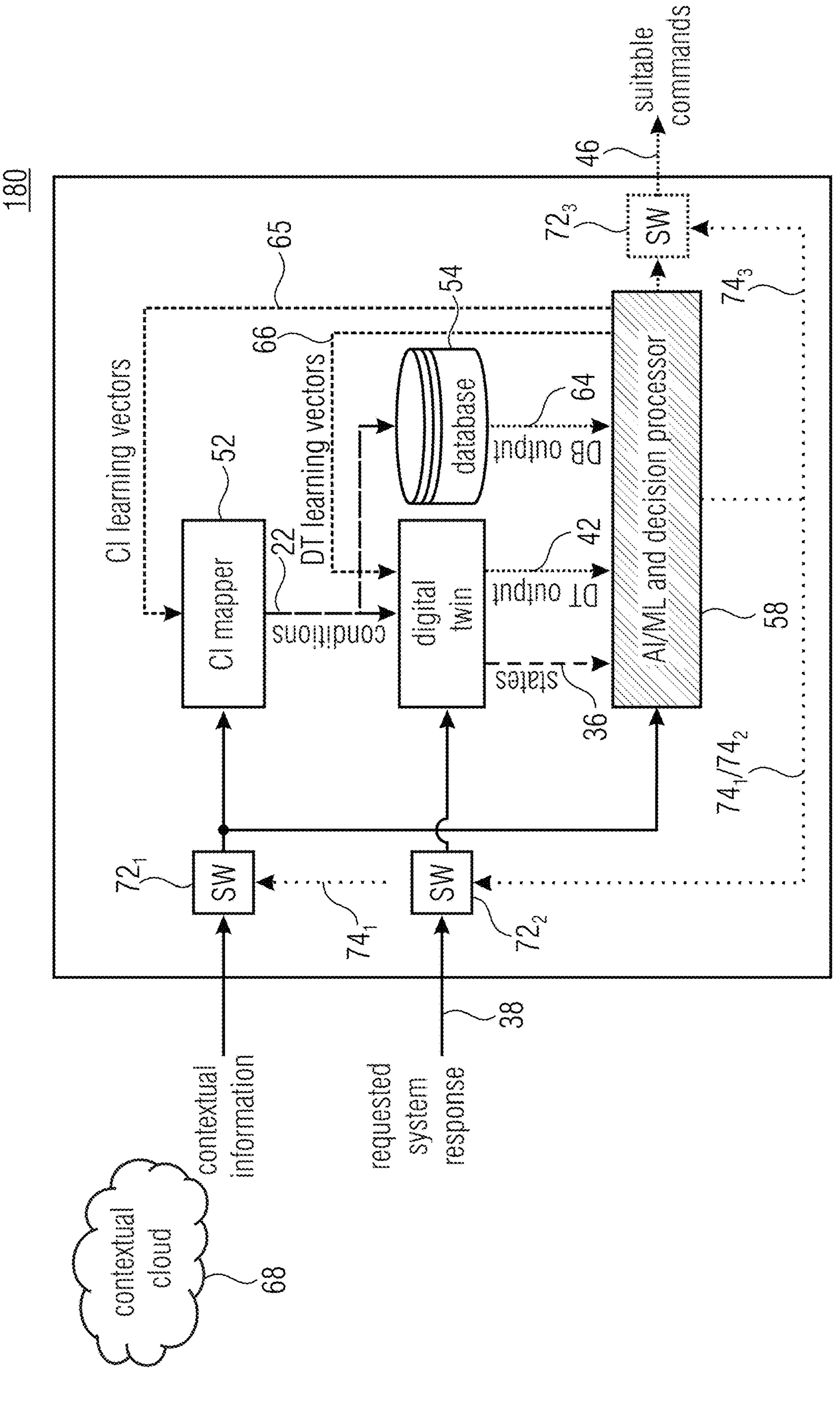
FIG. 18 shows a schematic block diagram of a cloud entity according to an embodiment having a learning processing unit and a database functionality.

Such a functionality may be extended in an arrangement shown in FIG. 18 showing a schematic block diagram of a cloud entity 180 having a learning processing unit and where the database functionality of FIG. 16 has been included. Signal lines 74$_1$, 74$_2$ and 74$_3$ that allow to control the states of the two input signal switches 72$_1$ and 72$_2$ and the single output switch 723 that were not shown in FIG. 17 are now included for completeness, that is, FIG. 10 shows a block diagram to illustrate the interconnection of the functional blocks used or needed to perform learning and execution processes.

During an assisted or partially informed learning mode, the AI/ML/DP block 58 may control the input switches 72$_1$ and 72$_2$ in such a way that the signals connected are routed to the functional blocks during certain learning cycles whilst during other cycles, the functional blocks are provided with self-generated learning vectors 65, 66. This combination of signals or vectors may provide a reduction in the ambiguity of the candidate command or a suitable command, may reduce the duration of the cycles, may increase the speed of execution, may reduce the complexity of the learning process and/reduce the overall energy consumption.

Further examples of the blocks labelled SW in addition to operate as simple ON/OFF or make/break or connect/disconnect switches (SW) may incorporate but is not limited to include:

- Selection of one or more or a subset of switches 72;
- pre-filtering; post-filtering;
- combinations in selection and/or filtering across the inputs and/or output;
- recursive loops, e.g., successive selection loop with feedback.

The table shown in FIG. 19 sets out a summary of the various modes of learning and execution and subjectively evaluates the performance in terms of duration, speed, complexity and energy consumption. Cross-references are provided to supporting figures which rely on the use of a cloud with contextual information and processing capabilities CCIPC. Information provided as identifying, e.g., FIG. 14 to be very long faster than 3 relates to line/ID #3, i.e., the example of FIG. 13. The disclosure that AI/ML allows for an execution mode that is very long faster than 6 relates to line/ID #6, i.e., a comparison to FIG. 14. In other words, FIG. 19 shows a summary of different learning and execution modes and a comparison of the duration, speed, complexity and energy consumption when used together with a CCIPC.

The table being shown in FIG. 20 sets out a summary of various modes of execution and subjectively evaluates the performance in terms of duration, speed, complexity and energy consumption. Cross-references are provided to supporting figures which do not rely on the use of a CCIPC. In other words, the table of FIG. 20 shows a summary of different execution modes and a comparison of their duration, speed, complexity and energy consumption. The table entries are, as are the entries of FIG. 19, applicable to apparatus, devices and other entities.

Embodiments allow to facilitate an improved and/or simplified establishment of a command chain between devices of one or more communication systems to achieve a higher efficiency and/or efficiency in (wireless) communication.

The enablement may include control-loop like interactions between communicating entities even without being in a classical master-slave (instructing device-instructed device) relationship such as that defined in a classical communication system, for example, a serving base station and one of its served UEs. In that sense, devices or entities of a first wireless communication system WCS and devises or entities of a second WCS can interact with each other regarding their "entangled" wireless communication system responses, for example, the radiated signals from one WCS affected the received wireless signals in another WCS, without the necessity of sharing a common control channel and/or a set of controlling command sets. Therefore, an implementation of, when referring to FIG. 6, A→C→B or B→C→A would be a practical implementation of a new radio control channel MRCC as described in WO 2022/136520 A1.

Furthermore, the invention allows sophisticated inter-device control loops between devices of:

- Different device classes
- Different capabilities of devices, e.g., in view of wireless communication or beamforming
- Different production dates
- Different internal instruction sets and/or command sets Different reporting capabilities Different insights into and effect on overall system behavior Different software versions (SW patches, releases, updates)

Different security levels

Different authorization levels

Different manufacturers beyond the classical boundaries of mandatory/optionally command set defined by standardization bodies.

Yet a further benefit offered by the invention is to provide for a means for the contextual cloud (C in FIG. 6) to perform the role of an observer or an overseer such that it is able to identify those entities which would later be referred to as the instructing device (device A) and the instructed device (device B). In other words, there may be situations, for example an interference scenario as shown in FIG. 21, where the identification of victim and aggressor is not known immediately or a priori and therefore entities A and B cannot be associated with aggressor or victim.

Figure 21:
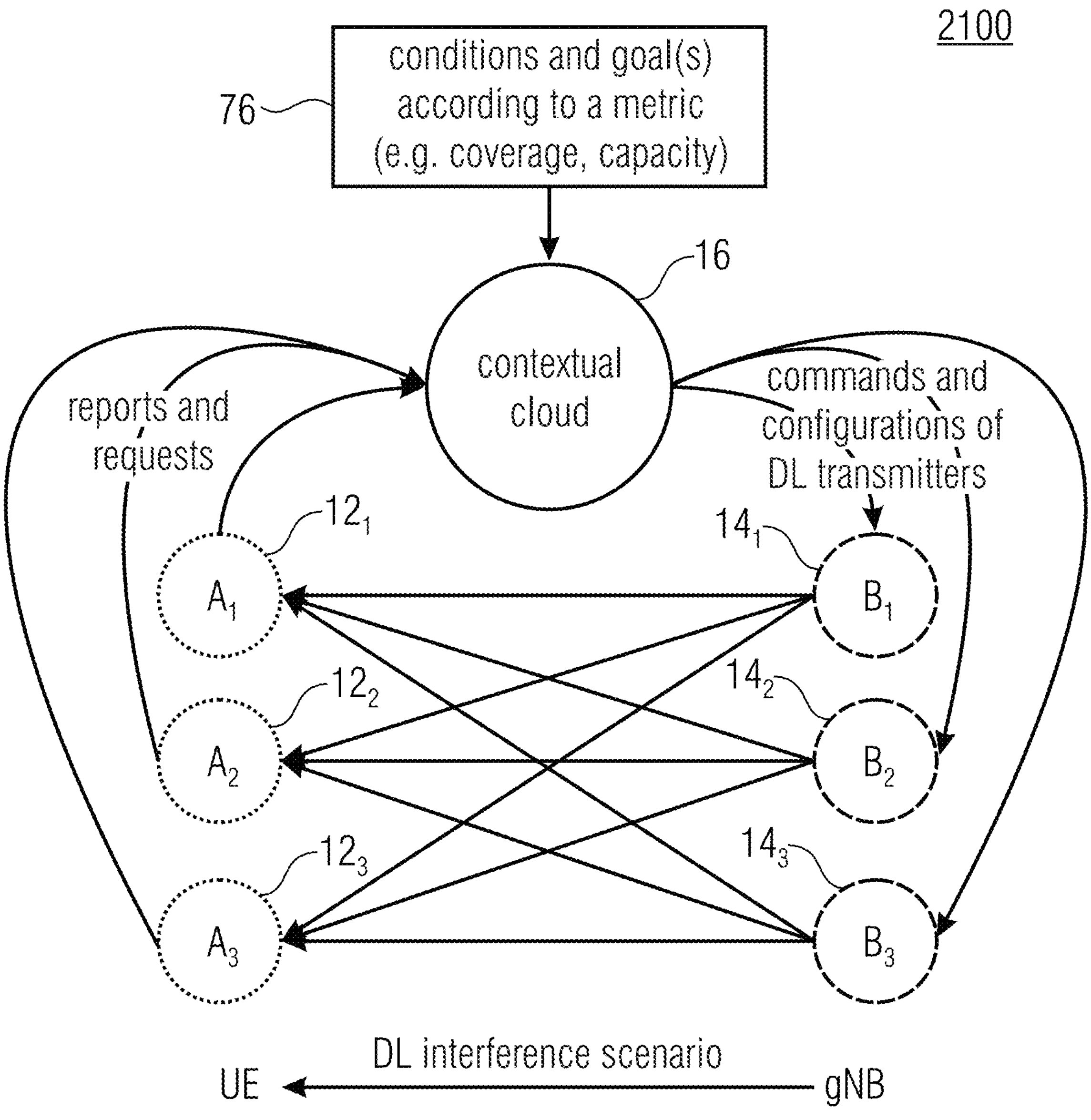
FIG. 21 shows a schematic block diagram of a wireless communication scenario 2100 according to an embodiment by representing a trellis structure.

FIG. 21 shows a schematic block diagram of a wireless communication scenario 2100 according to an embodiment by representing a trellis structure being used to shown the association of input (e.g., gNBs transmitters) and output (e.g., UE receivers) entities in a communication system experiencing downlink interference. An input 76, e.g., conditions and/or at least one goal according to a metric such as coverage or capacity, may be fed to a contextual cloud such as device 60 in FIG. 6. A number of three devices 12 and three devices 14 is arbitrary and may deviate from the number of 3 independently. The devices 12 may provide reports and/or requests to the cloud storage 16 that may provide commands and/or configurations of the downlink transmitters to devices 14.

The contextual cloud 16 however is able to observe and/or connect observations about a system behavior and may thus identify which A (device $\mathbf{12}_1$, $\mathbf{12}_2$ or $\mathbf{12}_3$) of many possible A's and which device B ($\mathbf{14}_1$, $\mathbf{14}_2$ or $\mathbf{14}_3$) of many possible B's are those associated with aggressor and victim. The observation data collected by the cloud may be provided by network entities such as the many A's and B's and/or by other entities whose sole role is to perform measurements and provide results of same to the network and the cloud at least during the considered time instance. It may thus be needed for specific observations to be made in a defined manner, e.g., a sample rate, a resolution, a timing reference, a frequency slot, a resource allocation, synchronized with other measurements, aggregation level L1, L2, L3, location, position or the like, according to the requirements of the cloud processor—hence the need for "targeted observation(s)". In this respect, the cloud 16 not only provides contextual information needed for the formation of appropriate signaling commands but may also identify the various role players. In its role as observer, the cloud 16 may perform both general and specific observations of system behavior which involve or could involve many devices 12 and/or many devices 14. It is through the use of AI/ML that the cloud 16 may be able to identify system behavior or patterns of behavior that could be improved or changed for the benefit of the majority or a specific targeted group of uses, at least within some of the embodiments described herein.

In connection with some of the embodiments, it may be of importance to note that all configuration commands towards the devices 12 and/or 14 and that the feedback from these entities may be specified and provided according to the requirements of the cloud processor together with measurement reports (from devices 12) and commanded system response contribution (from devices 14). Such measurement reports may be required to provide data according to specific formats such as resolution, bit-width, phase and amplitude. As an alternative or in addition, the quality of this data might also need to be indicated in terms of accuracy, uncertainty, tolerance, statistical properties, reliability and/or traceability associated with the measurement process and the manner in which the data is processed prior to sending a report.

The decision processor described herein may offer the potential and the functionality to substantially reduce both the energy consumed and the time taken for the computation and execution of the artificial intelligence and/or machine run processors. For example, the decision processor may decide which processing blocks to use or not to use in order to achieve one or more specific goals such as to compute faster and/or to save energy.

When referring back to method 900, such a method may comprise in view of the structure defined therein, using a digital twin and using a model of the digital twin, i.e., a model inference, to determine, from the contextual information, at least one condition of the DT, the condition of the twinned entity, by selecting information relevant for the DT from the contextual information. Such a functionality may be implemented, for example, by the CI mapper 52 that provides conditions 22.

With regard to method 900, same may comprise, as an optional step, obtaining operation information relating to an operation of the device in the wireless communication scenario and processing of the operation information to generate the contextual information. That is, each of methods 700 and 900 may be combined with the respective other method.

Figure 22:
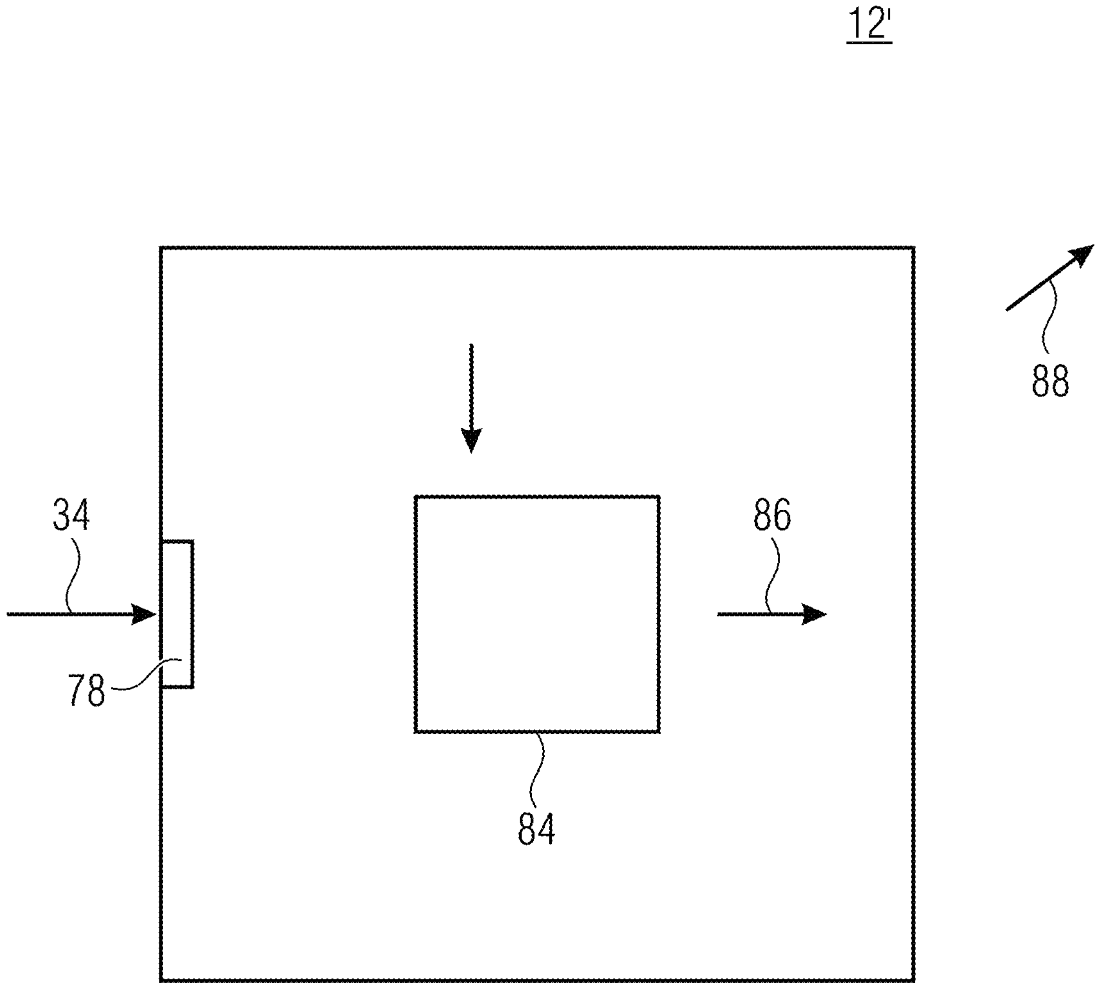
FIG. 22 shows a schematic block diagram of an apparatus according to an embodiment that may be configured for operating in a wireless communication scenario described herein as an instructing device.

FIG. 22 shows a schematic block diagram of an apparatus according to an embodiment that may be configured for operating in a wireless communication scenario described herein. Apparatus 12' being shown as a schematic block diagram may be operated, for example, as an instructing device 12 described herein. Apparatus 12' comprises an interface 78 configured for receiving and processing contextual information 34. The contextual information 34 relates to at least one of an influence of the operation of a device 12' in the wireless communication scenario and an influence of the operation of the wireless communication scenario on the device. The apparatus 12' is configured for obtaining information 82 about a target system behavior of at least a part of the wireless communication scenario, e.g., a requested system response. Apparatus 12' comprises a control unit 84 configured for processing the contextual information 34 and the information 82 to derive a command 86 for the device or the apparatus, e.g., a command 46. The apparatus comprises an interface for transmitting a signal 88 comprising the command 86. For example, this may be a wireless signal transmitted by use of an antenna and/or may comprise a use of interface 78.

Figure 23:
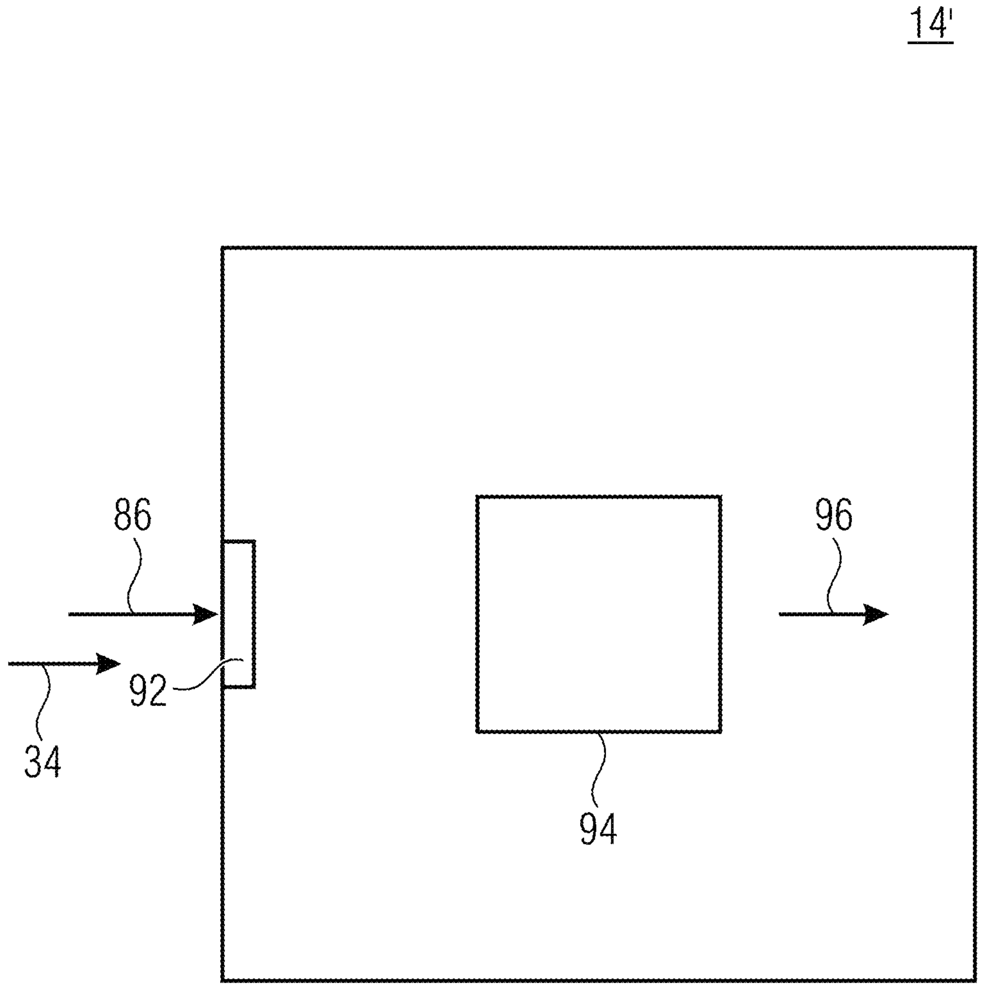
FIG. 23 shows a schematic block diagram of an apparatus according to an embodiment that may be used as an instructed device.

FIG. 23 shows a schematic block diagram of an apparatus 14' according to an embodiment that may be used as an instructed device described herein, e.g., device 14. Apparatus 14' is configured for operating in a wireless communication scenario, e.g., in a same scenario as apparatus 12'. Apparatus 14' comprises an interface 92 configured for receiving and processing a command 86, e.g., received together with signal 88, the command 86 related to an operation of the apparatus 14' in the wireless communication scenario. Apparatus 14' is configured for receiving and processing contextual information 34, e.g., by way of the same or a different radio signal, the contextual information 34 relating to at least one of an influence of an operation of a device on the wireless communication scenario and an influence of the operation of the wireless communication scenario on the device. This may relate to the device 14' and/or a different device.

Device 14' comprises a control unit 94 configured for processing the command 86 and the contextual information 34 to derive a request 96 for adapting the operation of the apparatus. The apparatus 14' is configured for operating according to the request, e.g., to adapt its operation. That is, from the command and by use of the contextual information, the device 14' may be controlled. The control unit 94 may, as the control unit 84, comprise processing means that may include, but are not limited to, a central processing unit, a microcontroller, a microprocessor or application specific circuitry.

Figure 24:
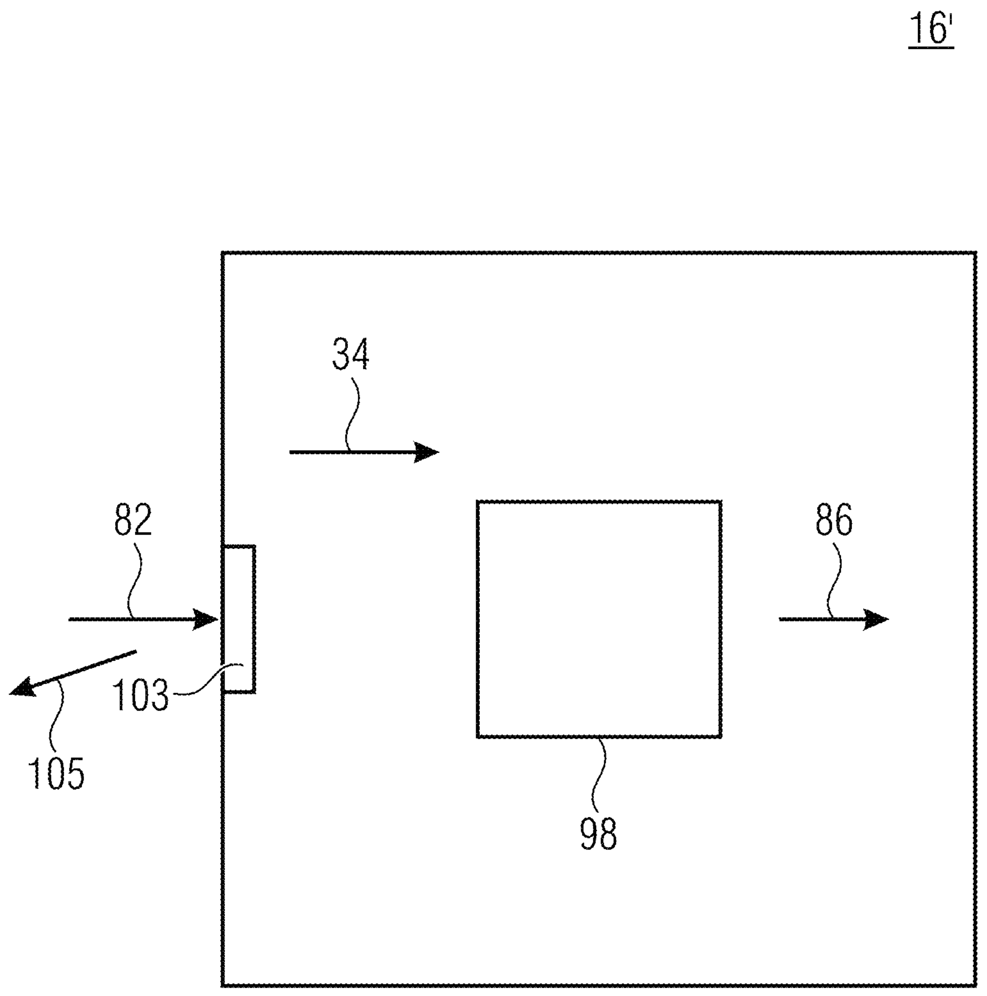
FIG. 24 shows a schematic block diagram of a cloud entity according to an embodiment configured to operate in connection with a wireless communication scenario.

FIG. 24 shows a schematic block diagram of a cloud entity 16' configured to operate in connection with a wireless communication scenario, e.g., as the storage 16 for contextual information. The cloud entity 16' is configured for using contextual information relating to at least one of an influence of the operation of a device on the wireless communication scenario and an influence of the operation of the wireless communication scenario on the device. The could entity 16' is configured for obtaining information 82 about the target system behavior of at least a part of the wireless communication scenario. The cloud entity 16' comprises a control unit 98 that may be adapted similarly to other control units described herein and that is configured for processing the contextual information 34 and the information 82 to derive a command 86 for a device of the wireless communication scenario. The cloud entity 16' comprises an interface 103 for transmitting a signal 105 comprising the command 86 to the device to adapt the operation thereof and/or for transmitting signal 105 to the wireless communication scenario to adapt the operation thereof. That is, the cloud entity 16' may operate as an instructing device.

Cloud entity 16' may operate as described in accordance with embodiments described herein. For example, when referring to FIGS. 10 to 15, the cloud entity 16' may comprise a digital twin processing unit, DTPU, configured for operating a digital twin of at least a part of the wireless communication scenario. The cloud entity 16' may be configured for receiving condition information representing a condition of at least a part of the wireless communication scenario, the condition possibly referring to a reference system behavior. The condition may be, for example, condition 22. The cloud entity may receive an input relating to a target behavior of the at least part of the wireless communication scenario and the DTPU may be configured for providing command information indicating a command such as command 86 for the at least part of the wireless communication scenario, e.g., as part of the DT output 64. The command 86 may be adapted or at least partly changing the behavior to the target behavior or towards the target behavior.

Such a cloud entity may comprise a learning processing unit configured for receiving the command information and to derive from the command information the command. The learning processing unit LPU may be adapted to receive information indicating the target behavior and information indicating a state of the DT and for learning, from the target behavior, the state and the command information a relationship between the command information and a target system behavior. The LPU may use a result of the learning for a future deriving from a future command information as described, for example, in connection with FIG. 17 and FIG. 18.

According to an embodiment, a cloud entity such as the cloud entity 16' may comprise a contextual information mapping processing unit CIMPU 52 configured for deriving, from the contextual information 34, the condition information by selecting parameters from the contextual information associated with the digital twin.

According to an embodiment, a cloud entity as described herein may be configured for receiving feedback from the wireless communication scenario about a result of the command and may be configured for receiving feedback information from a requester unit providing the information about the target system behavior. The cloud entity may be configured for interpreting the target system behavior, i.e., the entity may learn a meaning of the requests. The cloud entity may comprise a learning unit as described herein configured for learning, for future interpretation of a target system behavior, an effect of the command on the system behavior.

According to an embodiment, a cloud entity described herein, such as the cloud entity 16', may be configured for receiving feedback from the wireless communication scenario about a result of the command and may comprise a learning unit configured for learning for a future command based on correlating the command the feedback. The cloud entity may be adapted to use a result of the learning for providing the future command as described, for example, in connection with FIGS. 17 and 18.

A cloud entity according to an embodiment may comprise a decision processor, e.g., a function of block 58, configured for determining whether to use a digital twin of at least a part of the wireless communication scenario, an artificial intelligence, AI, and/or a machine learning, ML, function. For example, the switches 72 may be used to implement such a decision.

According to an embodiment, a cloud entity may comprise a database such as database 54 having stored therein a plurality of predefined commands, wherein the cloud entity is configured for using a predefined command from the plurality of predefined commands based on the target system behavior and based on the system behavior, e.g., the condition. When referring, for example, to FIG. 15 and/or FIG. 18, the output 64 may provide a predefined command to arrive at the target system behavior or at least close hereto.

According to an embodiment, a cloud entity comprises an input/conditions mapper 52 configured for mapping the system behavior and the target system behavior to determine an entry of the database to be selected.

According to an embodiment, a cloud entity described herein such as cloud entity 16' may comprise a learning processing unit LPU, e.g., as described in connection with FIG. 17 and/or 18, configured for adapting a database entry based on a feedback indicating a result of the command on the system behavior in relationship to the target system behavior. That is, the predefined entries in the database may be adapted based on an in-situ, live or online learning.

According to an embodiment, an entity for operating in a wireless communication scenario, e.g., any of the devices described herein, may comprise an interface configured for receiving and processing a signal comprising operation information relating to an operation of a device in the wireless communication scenario. This may relate to a measurement and/or observation of the operation of the device. The device may comprise a control unit processor configured for processing the operation information to generate a contextual information relating to at least one of an influence of the operation of the device on the wireless communication scenario and an influence of the operation of the wireless communication scenario on the device. The entity may be configured for using the contextual information and/or for providing the contextual information. For example, such and entity may implement method 700 and/or 900, e.g., as device 16 in FIG. 6.

According to an embodiment, such an entity may comprise a command generator unit configured for generating a control signal comprising instructions for adapting the operation of the device and/or the wireless communication scenario based on the contextual information, wherein the entity is configured for transmitting the control signal. For example, this function may correspond to the instructing device 12 or 12'.

Further embodiments described herein relate to a training of the model being used with the CI mapper 52 and/or the DT 28.

Figure 25:
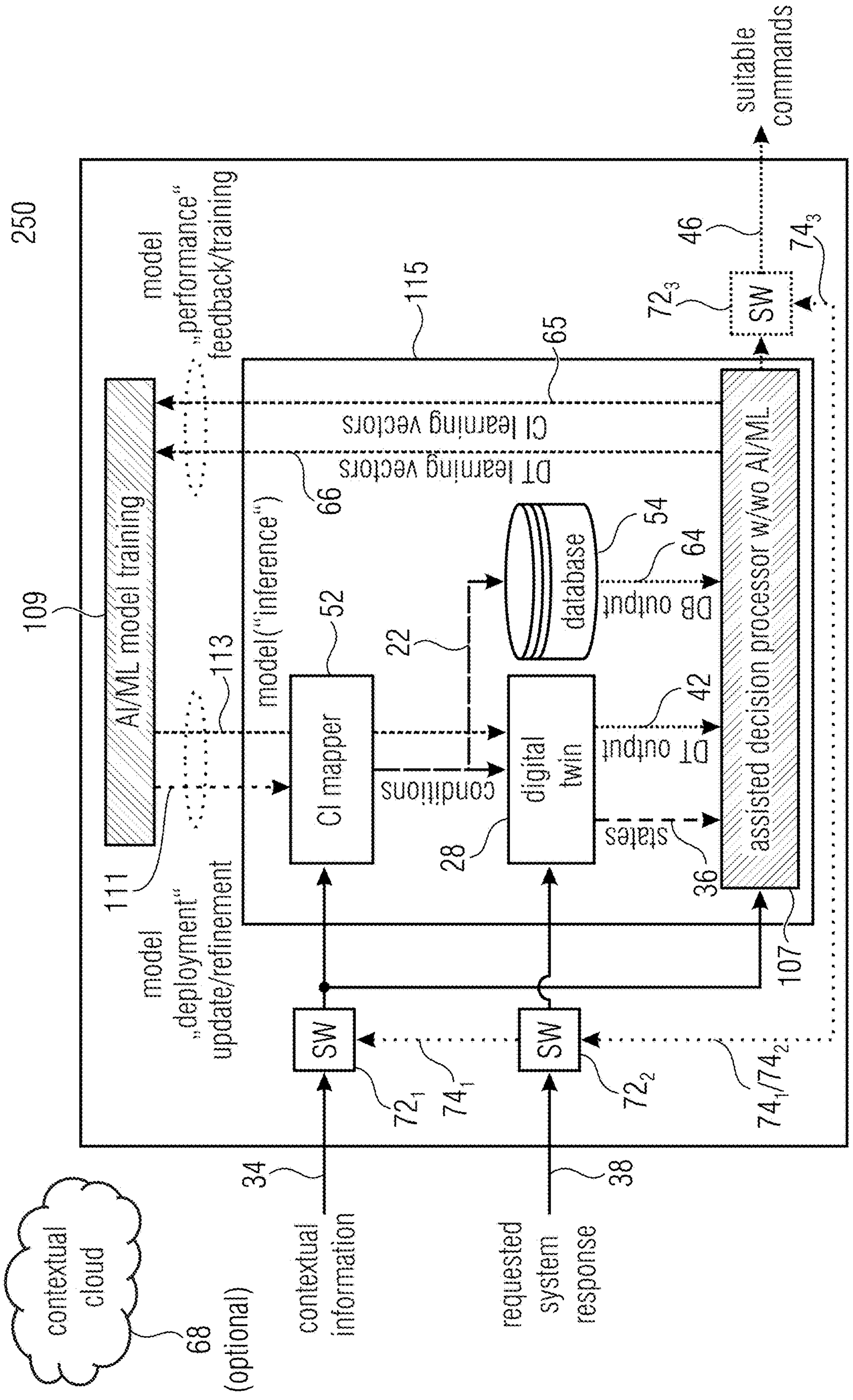
FIG. 25 shows a schematic block diagram of learning unit according to an embodiment.

FIG. 25 shows a schematic block diagram of learning unit 250 according to an embodiment. The learning unit may comprise a decision processor 107 that may optionally comprise functionality of artificial intelligence and/or machine learning which would allow to implement the decision processor 107 as the AI/ML/DP 58. Based on the functionality to provide for the control signals $\mathbf{74}_1$ through $\mathbf{74}_3$ for switches $\mathbf{72}_1$ through $\mathbf{72}_3$, learning vectors 65 and 66 may be provided. A model training unit 109, e.g., a processing unit or a calculator, that may optionally be based on artificial intelligence and/or machine learning may receive the learning vectors 65 and/or 66 as a feedback to allow to evaluate a model performance and/or a model training based on the received feedback. The training unit 109 may be configured for adjusting the CI mapper 52 and/or the DT 28 by using adjusting signals 111 and 113 or one of both. This may allow for a model deployment as an update and/or refinement.

The adjustable models used in the CI mapper 52 and the DT 28 along with the decision processor 107 and the optional database 54 may be referred to as a model interference 115.

Figure 26:
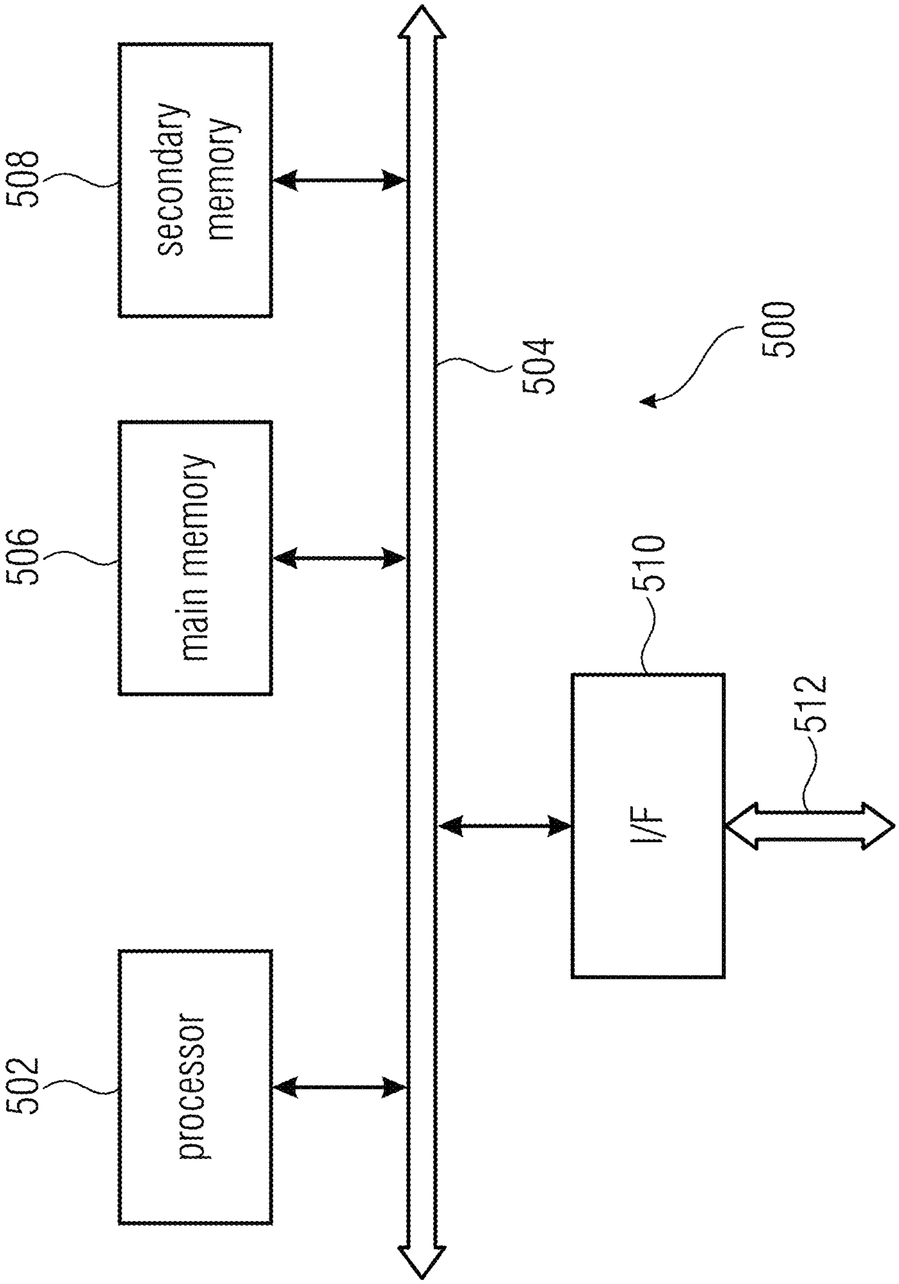
FIG. 26 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 26 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form of electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Abbreviations

| Abbreviation | Definition | Further description |
|---|---|---|
| 2G | second generation | |
| 3G | third generation | |
| 3GPP | third generation partnership project | |
| 3PC | third-party controller | |
| 4G | fourth generation | |
| 5G | fifth generation | |
| 5GC | 5G core network | |
| AAS | active antenna system | |
| AAU | advanced antenna unit | |
| ACLR | adjacent channel leakage ratio | |
| ADC | analogue-to-digital converter | |
| AF | application function | |
| AI | Artificial intelligence | |
| AP | access point | |
| ARQ | automatic repeat request | |
| AU | antenna unit | |
| BER | bit-error rate | |
| BLER | block-error rate | |
| BP | behaviour plane | |
| BS | basestation transceiver | |
| BT | Bluetooth | |
| BTS | basestation transceiver | |
| CA | carrier aggregation | |
| CBR | channel busy ratio | |
| CC | component carrier | contextual cloud |
| CCIPC | cloud with contextual information & processing capabilities | |
| CCO | coverage and capacity optimization | |
| CHO | conditional handover | |
| CI | contextual information | |
| CLI | cross-link interference | |
| CLI-RSS | cross-link interference received signal | |
| CP | control plane | |
| CP1 | control plane 1 | |
| CP2 | control plane 2 | |
| CPRI | common public radio interface | |
| CSI-RS | channel state information reference | |
| CU | central/centralized unit | |
| D2D | device-to-device | |
| DAPS | dual active protocol stack | |
| DAC | digital-to-analogue converter | |
| DC-CA | dual-connectivity carrier aggregation | |
| DECT | digitally enhanced cordless telephony | |
| DL | downlink | |
| DMRS | demodulation reference signal | |
| DOA | direction of arrival | |
| DRB | data radio bearer | |
| DT | digital twin | |
| DU | distributed unit | |
| ECGI | e-UTRAN cell global identifier | |
| E-CID | enhanced cell ID | |
| eCPRI | enhanced CPRI | |
| eNB | evolved Node b | |
| EN-DC | e-UTRAN-New Radio dual connectivity | |
| EUTRA | enhanced UTRA | |
| E-UTRAN | enhanced UTRA network | |
| FSS | frequency-selective surface | |
| gNB | next generation NodeB | |
| GNSS | global navigation satellite system | |
| GPS | global positioning system | |
| GSO | geostationary orbit | |
| HAPS | high-altitude platforms | |
| HARQ | hybrid ARQ | |
| IAB | integrated access and backhaul | |
| ID | identity/identification | |
| IF | intermediate frequency | |
| IIOT | industrial internet of things | |
| KPI | key-performance indicator | |
| LTE | long-term evolution | |
| MCG | master cell group | |
| MCS | modulation coding scheme | |
| MDT | minimization of drive tests | |
| MIMO | multiple-input/multiple-output | |
| ML | machine learning | |
| MLR | measure, log and report | |
| MLRD | MLR device | |
| MNO | mobile network operator | |
| MR-DC | multi-rat dual connectivity | |
| NCGI | new radio cell global identifier | |
| NEF | network exposure function | |
| NG | next generation | |
| ng-eNB | next generation eNB | node providing E-UTRA |
| NG-RAN | either a gNB or an NG-eNB | |
| NGSO | non-geostationary orbit | |
| NIC | network interface connection | |
| NR | new radio | |
| NR-U | NR unlicensed | NR operating in unlicensed |
| NTN | non-terrestrial network | |
| OAM | operation and maintenance | |
| OEM | original equipment manufacturer | |
| OTT | over-the-top | |
| oRAN | see open RAN | |
| Open RAN | open radio access network | |
| PCI | physical cell identifier | Also known as PCID |
| PDCP | packet data convergence protocol | |
| PER | packet error rate | |
| PHY | physical | |
| PLMN | public land mobile network | |
| QCL | quasi colocation | |
| RA | random access | |
| RACH | random access channel | |
| RAN | radio access network | |
| RAT | radio access technology | |
| RF | radio frequency | |
| RIM | radio access network information | |
| RIM-RS | rim reference signal | |
| RIS | reconfigurable intelligent surface | |
| RISC | RIS controller | |
| RLC | radio link control | |
| RLF | radio link failure | |
| RLM | radio link monitoring | |
| RP | reception point | |
| R-PLMN | registered public land mobile network | |
| RRC | radio resource control | |
| RRU | remote radio unit | |
| RS | reference signal | |
| RSRP | reference signal received power | |
| RSRQ | reference signal received quality | |
| RSSI | received signal strength indicator | |
| RSTD | reference signal time difference | |
| RTOA | relative time of arrival | |
| RTT | round trip time | |
| RU | radio unit | |
| SA | standalone | |

-continued

| Abbreviation | Definition | Further description |
| --- | --- | --- |
| SCEF | service capability exposure function | |
| SCG | secondary cell group | |
| SDU | service data unit | |
| SIB | system information block | |
| SINR | signal-to-interference-plus-noise ratio | |
| SIR | signal-to-interference ratio | |
| SL | side link | |
| SNR | signal-to-noise ratio | |
| SON | self-organising network | |
| SOTA | state-of-the-art | |
| SRS | sounding reference signal | |
| SS | synchronization signal | |
| SSB | synchronization signal block | |
| SSID | service set identifier | |
| SS-PBCH | sounding signal/physical broadcast | |
| TAC | tracking area code | |
| TB | transmission block | |
| TDD | time division duplex | |
| TN | terrestrial network | |
| TSG | technical specification group | |
| UAV | unmanned airborne vehicle | |
| UE | user equipment | |
| UL | uplink | |
| UP | user plane | |
| URLLC | ultra-reliable low latency | |
| UTRAN | universal trunked radio access network | |
| V2X | vehicle-to-everything | |
| VoIP | voice over internet protocol | |
| vRAN | virtual ran | |
| WI | work item | |
| WLAN | wireless local area network | |

LIST OF REFERENCES

[1] TS 38.304 v17.0.0 NR; User Equipment (UE) procedures in idle mode and in RRC Inactive state
[2] TS 38.101-1 v17.6.0 NR; User Equipment (UE) radio transmission and reception; Part 1: Range 1 Standalone
[3] TS 38.101-2 v17.6.0 NR; User Equipment (UE) radio transmission and reception; Part 2: Range 2 Standalone
[4] TS 38.213 NR; Physical layer procedures for control
[5] TS 38.331 NR; Radio Resource Control (RRC); Protocol specification

The invention claimed is:

1. A method for operating a wireless communication scenario, the method comprising: operating at least one device in the wireless communication scenario; operating a database comprising contextual information relating to at least one of an influence of the operation of the device on the wireless communication scenario and an influence of the operation of the wireless communication scenario on the device; wherein the influence is a functional relationship between an input parameter of the operation and an output parameter of the operation; determining a target behaviour of the device and/or of the wireless communication scenario; and using, the contextual information to generate a command for the device and/or a different apparatus of the wireless communication scenario as a receiving entity to instruct the receiving entity to apply an input parameter to acquire the target behaviour wherein generating the command comprises: using a digital twin, DT, of at least a part of the wireless communications scenario and/or of the device as a twinned entity, to derive, based on the target behaviour of the twinned entity and based on a condition of the twinned entity indicated by the contextual information, a state of the twinned entity that corresponds to the target system behaviour, the method comprising determining the command to cause the twinned entity to the state; and/or using the database having stored therein a plurality of database entries, wherein at least a subset of the plurality of database entries each associates a condition with information indicating a command; the method comprising: providing the condition of the at least part of the wireless communication scenario indicated by the contextual information to acquire the associated instruction.

2. The method of claim 1, comprising:

using the DT and using a model of the DT to determine, from the contextual information, at least one condition of the DT, the condition of the twinned entity, by selecting information relevant for the DT from the contextual information.

3. The method of claim 1, further comprising;

acquiring operation information relating to an operation of the device in the wireless communication scenario;

processing of the operation information to generate the contextual information.

* * * * *